US007284424B2

(12) United States Patent
Kanke et al.

(10) Patent No.: US 7,284,424 B2
(45) Date of Patent: Oct. 23, 2007

(54) THERMAL AIR FLOW RATE MEASURING APPARATUS AND ITS FLOWMETER AND INTERNAL COMBUSTION ENGINE AND THERMAL AIR FLOW RATE MEASURING METHOD USING IT

(75) Inventors: Atsushi Kanke, Hitachi (JP); Masamichi Yamada, Hitachinaka (JP); Shinya Igarashi, Naka (JP); Hiroshi Yoneda, Hitachinaka (JP); Kenji Ohta, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 10/484,575

(22) PCT Filed: Jul. 26, 2001

(86) PCT No.: PCT/JP01/06479

§ 371 (c)(1),
(2), (4) Date: Jul. 14, 2004

(87) PCT Pub. No.: WO03/012376

PCT Pub. Date: Feb. 13, 2003

(65) Prior Publication Data

US 2004/0244478 A1 Dec. 9, 2004

(51) Int. Cl.
*G01F 1/68* (2006.01)
(52) U.S. Cl. .................... 73/204.15; 73/204.26
(58) Field of Classification Search ............ 73/204.14, 73/204.15, 204.16, 204.17, 204.18, 204.19, 73/204.25, 204.26, 204.27
See application file for complete search history.

(56) References Cited

U.S. PATENT DOCUMENTS

| 4,587,842 | A | * | 5/1986 | Handtmann | ............... | 73/204.14 |
| 4,872,339 | A | | 10/1989 | Gerhard et al. | | |
| 4,984,460 | A | * | 1/1991 | Isoda | ...................... | 73/204.15 |
| 5,050,429 | A | * | 9/1991 | Nishimoto et al. | ...... | 73/204.26 |
| 5,369,994 | A | | 12/1994 | Hecht et al. | | |
| 5,493,906 | A | * | 2/1996 | Sen-Zhi | ................... | 73/204.15 |

(Continued)

FOREIGN PATENT DOCUMENTS

JP   6-63801   3/1994

(Continued)

OTHER PUBLICATIONS

Supplementary European Search Report dated Aug. 3, 2006 (Three (3) pages).

*Primary Examiner*—Harshad Patel
(74) *Attorney, Agent, or Firm*—Crowell & Moring LLP

(57) ABSTRACT

A thermal air flow rate measuring apparatus of great precision wherein sensitivity is enhanced by sensors having different output characteristics and an operating device employing a digitized signal. The sensitivity and temperature can be corrected easily depending on the flow direction of fluid. The measuring apparatus includes at least one heating resistor disposed in a gas fluid, temperature detecting resistors formed at an upstream part and a downstream part of the heating resistor in the flow direction of the fluid, a device for outputting at least two signals relating to the flow rate of the fluid, a quantizing device for quantizing the output values, and an operating device for operating the flow rate based on the quantized signals.

14 Claims, 15 Drawing Sheets

U.S. PATENT DOCUMENTS

| | | | |
|---|---|---|---|
| 5,750,889 A | 5/1998 | Kowatari et al. | |
| 5,753,815 A * | 5/1998 | Murata | 73/204.15 |
| 5,767,665 A * | 6/1998 | Morita et al. | 73/861.356 |
| 5,832,403 A | 11/1998 | Kowatari et al. | |
| 6,539,793 B2 * | 4/2003 | Tanimoto et al. | 73/204.15 |
| 6,550,325 B1 * | 4/2003 | Inushima et al. | 73/204.26 |
| 6,557,411 B1 * | 5/2003 | Yamada et al. | 73/204.26 |
| 6,763,711 B1 * | 7/2004 | Nair et al. | 73/204.15 |
| 6,840,102 B2 * | 1/2005 | Kouno | 73/204.15 |
| 6,923,053 B2 * | 8/2005 | Yamada et al. | 73/204.26 |

FOREIGN PATENT DOCUMENTS

| | | |
|---|---|---|
| JP | 6-64080 | 3/1994 |
| JP | 6-160142 | 6/1994 |
| JP | 6-2300021 | 8/1994 |
| JP | 07-333026 | 12/1995 |
| JP | 08-005433 | 1/1996 |
| JP | 8-166271 | 6/1996 |
| JP | 09-015013 | 1/1997 |
| JP | 9-318412 | 12/1997 |
| JP | 10-300544 | 11/1998 |
| JP | 11-051954 | 2/1999 |
| JP | 11-094620 | 4/1999 |
| JP | 2000-146651 | 5/2000 |

* cited by examiner

THERMAL AIR FLOW RATE MEASURING APPARATUS AND ITS FLOWMETER AND INTERNAL COMBUSTION ENGINE AND THERMAL AIR FLOW RATE MEASURING METHOD USING IT

TECHNICAL FIELD

The present invention relates to a novel thermal air flow rate measuring apparatus and a novel thermal air flow rate measuring method, and to an internal combustion engine using the thermal air flow rate measuring apparatus and a thermal air flow rate measuring method suitable for detecting an intake air flow rate of the internal combustion engine.

BACKGROUND ART

As an air flow rate apparatus for measuring an intake air flow rate arranged in an electronically controlled fuel injection unit of an internal combustion engine in a vehicle or the like, air flow rate measuring apparatuses of thermal type have been widely used because of capability of directly detecting a mass air flow rate. Therein, its heating resistor is constructed by winding a platinum wire around a bobbin and then coating the wire with glass, or by forming a thin film resistor on a ceramic substrate or a silicon substrate.

As the methods of detecting a flow rate, there are a type in which a heating resistor is heated up to a given temperature and a flow rate is directly detected from a value of current flowing through the resistor when a fluid flows, and a type in which temperature detecting resistors are arranged in both sides of a heating resistor and a flow rate is detected from a temperature difference between the temperature detecting resistors.

Particularly in vehicles, in a case of pulsating flow having a large pulsating amplitude of an intake air flow rate and partial reversed flow, which may take place under a low rotation speed and a heavy load condition in an engine having four or less cylinders, the conventional air flow rate measuring apparatus requires an output signal corresponding to the air flow direction because the accuracy of the measured flow rate becomes poor. The type, in which temperature detecting resistors are arranged in both sides of the heating resistor and an air flow rate is detected from a temperature difference between the temperature detecting resistors, is suitable for detecting an output signal under the condition of existing of the reversed air flow because the output signal corresponds to the flow direction.

Since each of the above two types has advantages and disadvantages depending on the use, a type combining the above both types using an analog circuit is disclosed in Japanese Patent Application Laid-Open No. 9-318412, and in Japanese Patent Application Laid-Open No. 11-51954. That is, since the temperature difference output signal having a comparatively high sensitivity is deteriorated in a high flow rate side due to saturation of the sensitivity, the temperature difference output signal is output by adding the output signal of the direct detecting type having low sensitivity in the low flow rate side and high sensitivity in the high flow rate side using a differential amplifier.

As methods of compensating the output signal of temperature difference between the temperature detecting resistors having the comparatively good sensitivity other than the above described method of compensating the sensitivity, a method of compensating the output signal by dividing by a temperature rise of a heater is disclosed in Japanese Patent Publication No. 6-63801, and a method of compensating temperature is disclosed in Japanese Patent Publication No. 6-64080.

In addition, as another method of compensating the output signal of temperature difference between the temperature detecting resistors particularly for vehicles, a method of compensating the output signal by detecting temperature of a medium is disclosed in Japanese Patent Application Laid-Open No. 6-160142.

On the other hand, as digitized methods using an A/D converter, a method of compensating a zero point depending on the output signal of a temperature detecting resistor is disclosed in Japanese Patent Application Laid-Open No. 6-230021. Further, a method of digitally compensating temperature is disclosed in Japanese Patent Application Laid-Open No. 11-94620.

In the prior art described above, particularly, as the methods of compensating the accuracy of output signal of the temperature difference between the temperature detecting resistors, various types mainly using an analog circuit have been proposed. In the analog circuit, various kinds of devices different in the measuring range of flow rate corresponding to the uses are required, and the circuits and the adjustments become complex in order to improve the accuracy. Therefore, these increase the cost. Although the type of digitally compensating the zero point or the type of digitally compensating temperature has been studied, adjusting of sensitivity of the whole sensors has not been considered.

DISCLOSURE OF INVENTION

An object of the present invention is to provide a thermal air flow rate measuring apparatus and a thermal air flow mater having high accuracy, in which sensitivity is enhanced by an operating means using sensors having different output characteristics and employing a digitized signal, and the sensitivity and temperature can be corrected easily depending on the flow direction of fluid, and to provide an internal combustion engine and a thermal air flow rate measuring method using the thermal air flow rate measuring apparatus.

The present invention is characterized by a thermal air flow rate measuring apparatus comprising at least one heating resistor disposed in a gas fluid, temperature detecting resistors formed at an upstream part and a downstream part of the heating resistor in a flow direction of the fluid, an output means for outputting at least two signals relating to a flow rate of said fluid from the heating resistor and the temperature detecting resistors, a quantizing means (a digitizing means) for quantizing (digital-converting) the output values, and an operating means for operating the flow rate based on the quantized signals; or a thermal air flow rate measuring apparatus comprising an operating means for operating the at least two quantized (digital-converted) signals using at least two parameters, and a synthesizing and outputting means for synthesizing the operated signals and outputting the synthesized result; or a thermal air flow rate measuring apparatus comprising an operating means for operating the at least two quantized (digital-converted) signals using at least two parameters, and an output means for synthesizing the operated signals and outputting the synthesized result, wherein the two signals relating to the flow rate are signals relating to a heat generating value of the heating resistor and to a temperature difference between the temperature detecting resistors formed at the upper stream part and the downstream part.

Further, the present invention is characterized by a thermal air flow rate measuring apparatus comprising at least one heating resistor disposed in a gas fluid, a flow rate detecting means for detecting a flow rate of the fluid using the heating resistor by driving the heating resistor at a constant temperature using a temperature compensating resistor; flow rate detecting means for detecting the flow rate from a temperature difference between temperature detecting resistors each arranged in both sides of the heating resistor; a quantizing means (a digitizing means) for quantizing (digitizing) a value from the heating resistor and a value according to the temperature difference; an operating means for operating the quantized (digital-converted) values; and a correcting means for correcting the operated values.

Further, the present invention is characterized by a thermal air flow rate measuring apparatus comprising at least one heating resistor disposed in a gas fluid; temperature detecting resistors formed at an upper stream part and a downstream part of the heating resistor in a flow direction of the fluid, the temperature detecting resistors being arranged in multi-stage along a longitudinal direction of the heating resistor individually at the upstream part and the downstream part; in addition, an output means for outputting at least two signals relating to a flow rate of the fluid from the heating resistor and the temperature detecting resistors; a quantizing means for quantizing the output values; and an operating means for operating the flow rater and directions of the fluid based on the quantized signals.

The present invention is characterized by a thermal air flow rate measuring method, which operates a flow rate and a flow direction of a gas fluid based on a signal relating to an amount of heat generated by at least one heating resistor disposed in the gas fluid; a signal relating to a temperature difference between an upstream part and a downstream part of temperature detecting resistors in a flow direction of the fluid, said temperature detecting resistors being formed in multistage respectively at the upstream part and the downstream part of the heating resistor; and a signal relating to a flow difference of the fluid other than the temperature difference, or, in addition to these, based on quantized signals obtained by quantizing the signals described above.

In other words, the present invention comprises a heating resistor; a means for detecting a flow rate by driving the heating resistor at a constant temperature using a temperature compensation resistor; a means for detecting a flow rate from a temperature difference between temperature detecting resistors by arranging the temperature detecting resistors in both sides of the heating resistor; a quantizing means (a digitizing means) for inputting a signal corresponding to the flow rate obtained from the heating resistor and a signal corresponding to the flow rate obtained from the temperature difference; and a means for quantizing-operating (digital-operating) the both signals to perform correction and adjustment.

According to the present invention, even in a case where the air flow rate measuring apparatus is used in different measuring ranges, the measurement accuracy can be improved by using the two flow rate signals different in the detection principles and easily adjusting the output sensitivity through the digital optimization operation.

In the present invention, the function of the first or higher order equation described above is expressed by any one of ($q1=a1 \times f1+b1$, $q2=f2$, ...), ($q1=f1$, $q2=a2 \times f2+b2$, ...) and ($q1=a1 \times f1+b1$, $q2=a2 \times f2+b2$, ...), and the function for temperature is expressed by ($a1=c1 \times Ta+d1$, $b1=c2 \times Ta+d2$, ...), and the function for the quantized signal is expressed by ($a1=g1 \times f1+h1$, $b1=g2 \times f1+h2$, ...). A function of the second or third order may be employed for each of the above functions.

According to the present invention, even in a case where the air flow rate measuring apparatus is used in different measuring ranges, the measurement accuracy can be improved by using the two flow rate signals different in the detection principles and easily adjusting the output sensitivity through the digital optimization operation.

In a hot-wire type air flow meter for measuring an intake air flow rate of an internal combustion engine used in a vehicle or the like, the present invention provides devices different in the flow rate measuring ranges corresponding to various uses, and improves the measurement accuracy by adjusting the total sensitivity of sensors, and simplifies the circuit and the adjustment.

By obtaining the air flow meter having high sensitivity and high accuracy by executing the digital compensation described above, there is the effect that amount of exhaust gas from an engine of a vehicle can be reduced by optimizing the engine control.

BEST MODE FOR CARRYING OUT THE INVENTION

Embodiment 1

Figure 1:
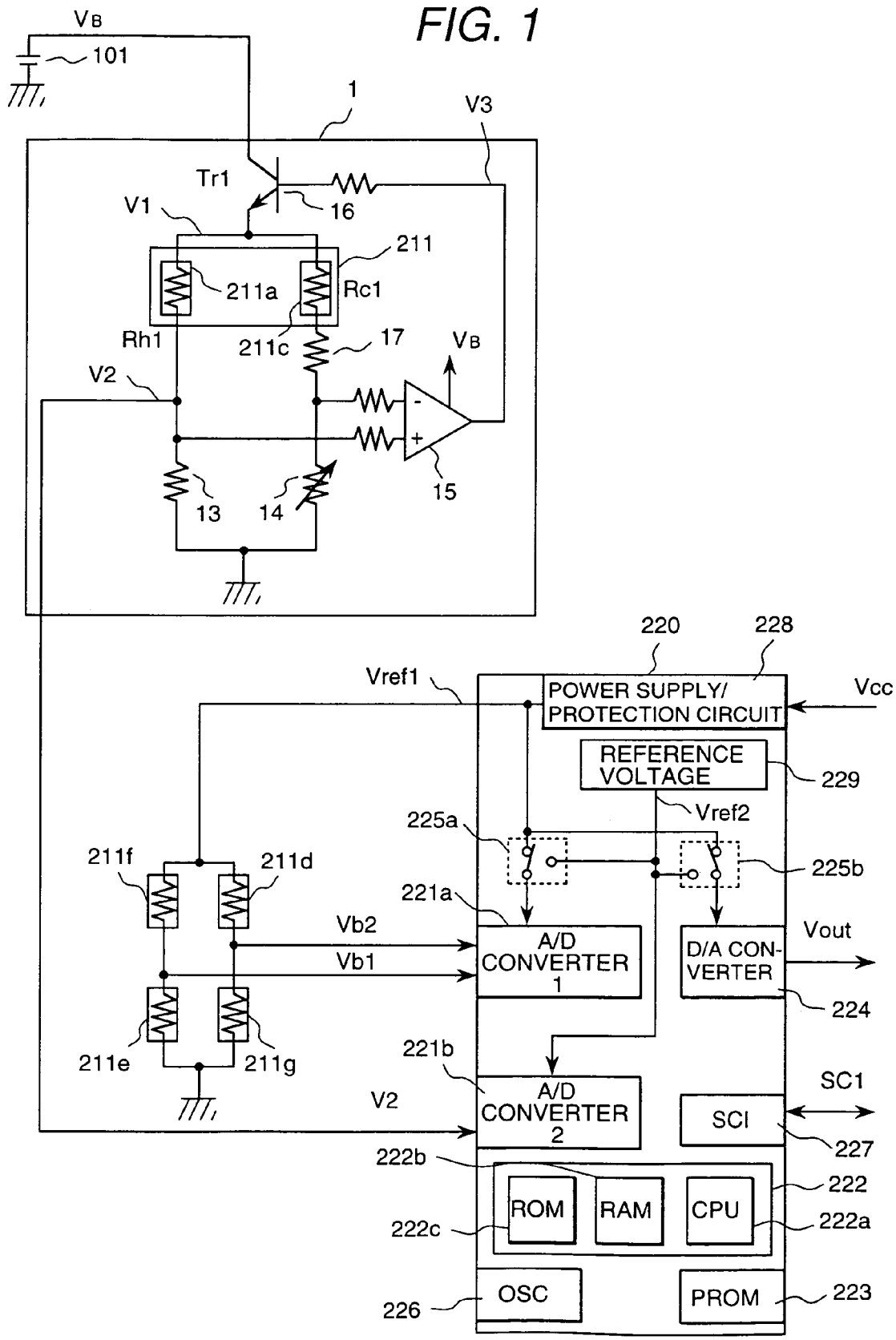
FIG. 1 is a diagram showing a drive circuit of a thermal air flow rate measuring apparatus according to the present invention.

FIG. 1 is a diagram showing a drive circuit of a thermal air flow rate measuring apparatus according to the present invention. A hot-wire drive circuit 1 is connected to a power source 101 to output a signal corresponding to an air flow rate. The hot-wire drive circuit 1 comprises a Wheatstone bridge composed of a heating resistor 211a, a temperature compensation resistor 211c and resistors 13, 14 and 17, and is constructed in such a manner that current flowing through the heating resistor 211a can be controlled by a differential amplifier 15 and a transistor 16 to make an electric potential difference between the midpoints of the bridge zero. When the heated temperature of the heating resistor 211a is low, an output of the differential amplifier 15 becomes large so as to further heat up the heating resistor 211a. By this construction, the resistance value of the heating resistor 211a is controlled at a constant value independently of the flow rate, that is, the current flowing through the heating resistor 211a is controlled so as to keep the temperature at a constant value. At that time, as for the signal of the heating resistor 211a corresponding to the air flow rate, a voltage signal V2 is obtained by converting the current flowing through the heating resistor 211a to a voltage by the resistor 13 and inputted to a digital correction circuit 220.

Therein, the heating resistor 211a may be constructed, for example, by forming a thin film or a thick film made of platinum or tungsten as a heat-generator on a glass plate or a ceramic substrate. Particularly, the heating resistor 211a is a resistor in which a thin film or a thick film made of platinum or tungsten as a heat-generator, or a poly-silicone resistor, or a single-crystal silicon resistor is formed on a semiconductor substrate made of silicon or the like.

The heating resistor 211a is disposed inside an intake air passage of an internal combustion engine for a vehicle etc to obtain the voltage output V2 corresponding to a flow rate of air flowing in the intake air passage.

On the other hand, an output corresponding to a direction of flow can be obtained from the method that temperature detecting resistors 211d, 211e, 211f and 211g are arranged in the both sides of the heating resistor 211a to form a bridge by the temperature detecting resistors 211d, 211e, 211f and 211g, and then a temperature difference between the resistors is detected from a difference between voltage potentials at midpoints. Therein, the temperature detecting resistors 211d, 211e, 211f and 211g are driven at a constant voltage by a power supply voltage Vref1. The method of detecting the temperature difference between the resistors is high in the sensitivity in the low flow rate side because of using deferential detection and suitable for detecting a bidirectional flow such as back flow, but the sensitivity in the high flow rate side is apt to be limited because of being driven at the constant voltage.

Figure 2:
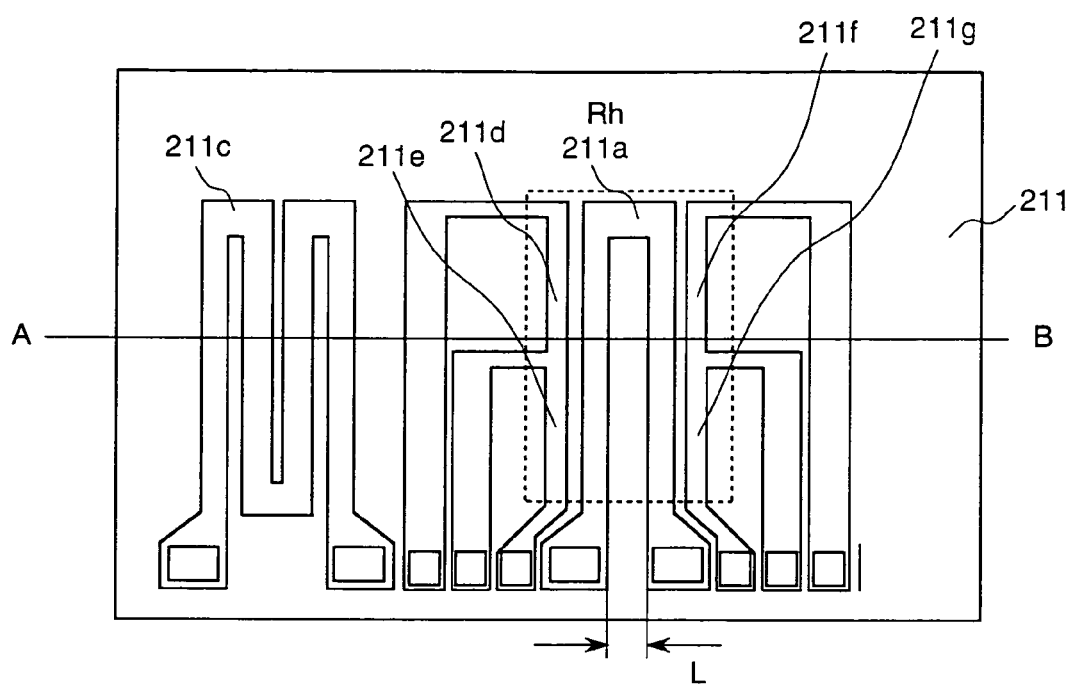
FIG. 2 is a view showing a pattern of a thermal air flow meter having a heating resistor formed on a silicon substrate.

FIG. 2 is a view showing an example of a pattern in which the heating resistor 211a of thin film is formed on a silicon semiconductor substrate. The heating resistor 211a is formed in an oblong shape with a back-and-forth turned pattern of the resistance thin-film wire, and the temperature detecting resistors 211d, 211e, 211f and 211g are arranged in the both sides of the heating resistor. The heating resistor 211a and the temperature detecting resistors 211d, 211e, 211f and 211g are arranged in a diaphragm structure part of the silicon substrate 211, the diaphragm structure part being formed, for example, by etching the substrate from the back face, and having a small thermal capacity. A temperature compensation resistor 211c is arranged at a position insensitive to temperature rise caused by heat generation of the heating resistor 211a.

The principle of detecting a flow rate from a temperature difference will be described below in detail. In FIG. 2, air normally flows from A toward B. Even when there is no air flow, a temperature distribution is caused in the heater by being heated by the heating resistor 211a. Under a condition of no air flow, since all the resistance values of the temperature detecting resistors 211d, 211e, 211f and 211g are the same, no output is generated even when the bridge circuit is formed. When air flow takes place, the temperature distributions in the both sides of the heating resistor 211a are changed to obtain an output corresponding to an air flow rate. In more detail, the resistance values of the temperature detecting resistors 211d and 211e in the upstream side of the heating resistor 211a are decreased because their temperatures are decrease, and the resistance values of the temperature detecting resistors 211f and 211g in the downstream side are increased because their temperatures are increase by receiving heat from the heating resistor 211a, and thus the produced temperature difference between the upstream side and the downstream side can be obtained as the change in the resistance values.

As described above, by forming the bridge using the plurality of temperature detecting resistors arranged in the longitudinal direction of the heating resistor 211a, the sensitivity of detecting the temperature difference can be improved. From the principle, even when two temperature detecting resistors are arranged in the upstream side and the downstream side, respectively, and a bridge is constructed using the two temperature detecting resistors by combining with two resistors particularly insensitive to temperature, the same detection can be performed. However, the sensitivity of output voltage to change in the temperature detecting resistors decreases lower compared to the case where the plurality of temperature detecting resistors are arranged in the longitudinal direction of the heating resistor 211a, described above. In a case where the temperature dependency of the temperature detecting resistors is high, two temperature detecting resistors in total may be arranged each in the upstream side and the downstream side. However, in a case where the temperature dependency of the temperature detecting resistors is high, and accordingly, sufficient output sensitivity can not be obtained, it is preferable that a plurality of, particularly two, temperature detecting resistors are arranged respectively in the upstream side and the downstream side.

Figure 3:
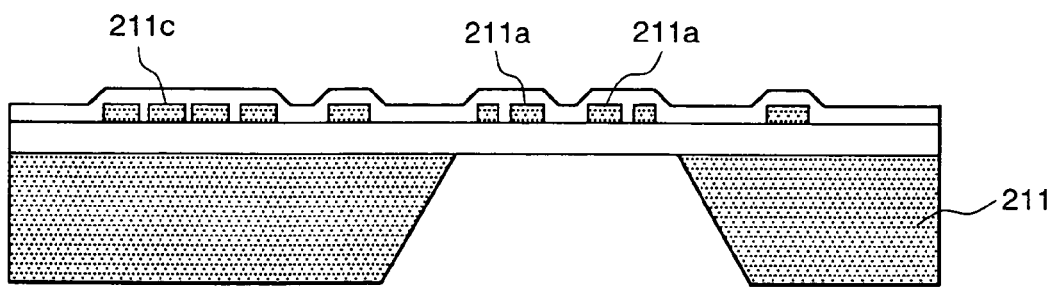
FIG. 3 is a cross-sectional view showing the thermal air flow meter being taken on the plane of the line A-B of FIG. 2.

FIG. 3 is a cross-sectional view of the resistors formed on the silicon substrate. The area having the resistor patterns is constructed so as to have the thickest substrate. In the present embodiment, the electric potentials Vb1 and Vb2 of the midpoints of the bridge composed of the temperature detecting resistors 211$d$, 211$e$, 211$f$ and 211$g$ are also inputted to the digital correction circuit 220. The digital correction circuit 220 has two analog-digital converters 221$a$ and 221$b$, and reads a voltage corresponding to the flow rate by converting the voltage to a digital value, and adjusts the digital value through operation, and then obtains an output voltage Vout from a digital-analog converter 224 to output the obtained signal to an engine control unit and so on. Therein, the digital correction circuit 220 comprises an operation (calculation) circuit 222 composed of a CPU 222$a$, a RAM 222$b$ and a ROM 222$c$; an oscillator 226; a PROM 223; and so on. The PROM 223 may be any memory capable of storing variations in output sensitivities of individual sensors once or more times as adjusting values, and therefore, is not limited to an electrically rewritable EEPROM, a flash ROM or the like.

Further, by inputting a voltage Vcc supplied from the external to an internal power supply/protection circuit 228 as a power supply, a power supply voltage Vref1 dependent on the external voltage Vcc is used as the reference voltage by connecting the power supply/protection circuit 228 to the analog-digital converters 221$a$ and 221$b$, the digital-analog converter 224 through switches 225$a$ and 225$b$. The switches 225$a$ and 225$b$ are for switching between a voltage Vref2 generated by a reference voltage circuit 229 inside the digital correction circuit 220 and the power supply voltage Vref1 depending on the external voltage Vcc described above. Therein, the analog-digital converters 221$a$ and 221$b$ are required to be high accurate because the outputs Vb1, Vb2, V2 etc of the bridge circuits are directly inputted. In order to secure the high accuracy and to make the size of the circuit small, it is preferable to employ a . . . -type analog-digital converter.

In the present embodiment, the analog-digital converters are provided separately for digitizing the voltage signal V2 obtained by converting the current flowing through the heating resistor 211$a$ to a voltage using a resistor 13 and for digitizing the electric potentials Vb1 and Vb2 of the midpoints of the bridges composed of the temperature detecting resistors 211$d$, 211$e$, 211$f$ and 211$g$ showing a temperature difference corresponding to a flow rate. The reason is that both of the principles for detecting flow rate are different from each other, and that each of the constructions can be easily optimized.

The voltage signal V2 is for controlling the bridge voltage of the hot-wire drive circuit 1 by feedback, and the output is independent of the power source voltage Vcc of the digital correction circuit 220 etc. Since an independent reference voltage is, therefore, required for the analog-digital conversion, the reference voltage Vref2 is provided to apply to the analog-digital converter 221$b$ as the reference.

On the other hand, although the temperature detecting resistors 211$d$, 211$e$, 211$f$ and 211$g$ are driven at a constant voltage by the power supply voltage Vref1, the electric potentials Vb1 and Vb2 of the bridge midpoints are increased and decreased by fluctuations of the power supply voltage Vref1. One of the methods of removing this phenomenon is that the power supply voltage Vref1 is used as the reference voltage of the analog-digital converter 221$a$, and at the digital conversion, a read value is changed similarly to the fluctuations of the power supply voltage Vref1. Particularly, the present embodiment is constructed so that the reference voltage of the analog-digital converter 221$a$ can be switched by providing the switch 225$a$. When the fluctuations in the power supply voltage is very small, a reference voltage Vref2 of a reference voltage circuit 229 may be used for the reference voltage of the analog-digital converter 221$a$.

Further, the digital-analog converter 224 is similarly constructed so that the reference voltage can be changed by the switch 225$b$. The reason is that the reference can be freely selected when an analog value is used in the interfacing. In a case where the reference voltage of the analog-digital converter in the side of a connected control unit and the voltage Vcc supplied from the external are similar to each other or fluctuate in synchronism with each other, the power supply voltage Vref1 is used as the reference. In a case where there is no relation between the reference voltage of the analog-digital converter in the control unit side and the voltage Vcc, the independent reference voltage Vref2 is selected to make matching with the corresponding control unit easy and to make an error due to mismatching of the analog interface smaller.

Figure 4:
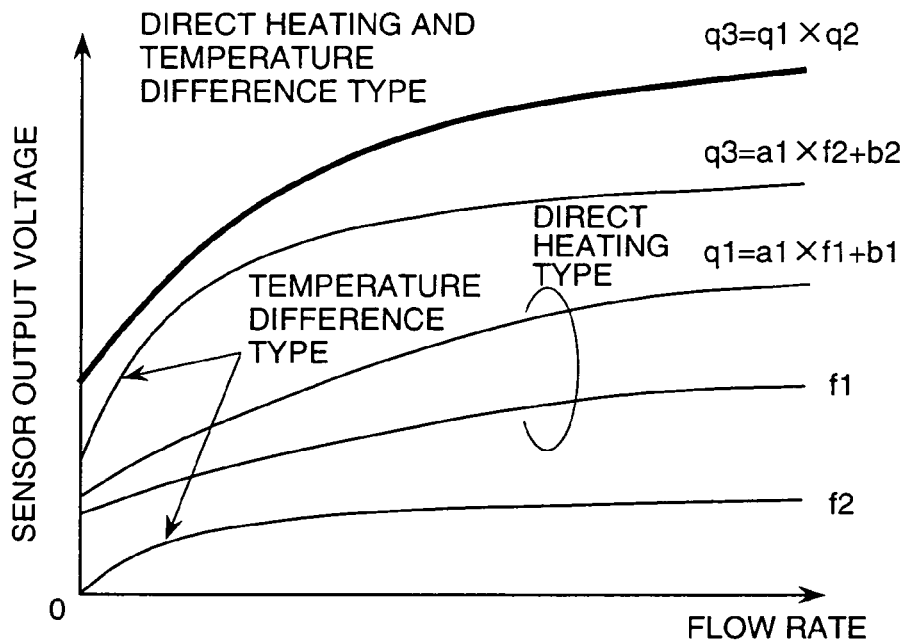
FIG. 4 is a graph showing an example of correction of the characteristic of output voltage versus air flow rate of a thermal air flow meter in accordance with the present invention.

By constructing the digital correction circuit 220 as described above, the output sensitivity can be improved, and an air flow meter easy in adjustment can be obtained. The detailed operation will be described below, referring to FIG. 4. In FIG. 4, the characteristic of output versus flow rate obtained from the voltage signal V2 by converting the current flowing through the heating resistor 211$a$, described above, is expressed by a curve f1, and the characteristic output versus flow rate obtained from the voltage difference dV between the electric potentials Vb1 and Vb2 of the bridge midpoints, which shows the temperature difference corresponding to the flow rate obtained by the temperature detecting resistors 211$d$, 211$e$, 211$f$ and 211$g$, is expressed by a curve f2.

Since the heating current of the heating resistor 211$a$ is flowing even in the condition of zero flow, the output characteristic curve f1 becomes an offset output voltage characteristic curve which does not pass through the origin. The zero point of the output characteristic curve is apt to fluctuate due to natural convection under self-heating in the condition of zero flow, but the output characteristic curve does not saturate in the high flow rate region within a range allowed by the power supply voltage. Therefore, in a case of using the heating resistor 211$a$ having a small heat capacity, the sensitivity, particularly, in the low flow rate side is degraded, but the sensitivity in the high flow rate side is high.

On the other hand, the output characteristic curve f2 ideally passes through the origin at the zero flow because the output voltage is the difference between the electric potentials at the bridge midpoints. The sensitivity, particularly, from the zero flow to the low flow rate side is high, but the output voltage in the high flow rate side changes smaller to saturate because the difference between temperatures of the resistors becomes small.

In order to actually deal with the characteristics described above, a zero-span adjustment, in which the zero point is adjusted by amplifying it using a differential amplifier or the like, is generally performed through an analog method. By doing so, the sensitivity characteristic may be improved in appearance, but the essential sensitivities of the output voltage characteristics f1 and f2 are not changed. In other words, there are the contradicting characteristics that the characteristic f1 has the low sensitivity in the low flow rate but the high sensitivity to the high flow rate side, and that the characteristic f2 has the high sensitivity to the low flow rate but the low sensitivity in the high flow rate side. In order to improve these characteristics, it can be considered that the characteristics are changed using an analog operating (calculating) circuit composed of differential amplifiers etc. However, performing of complex analog operation (calculation) to compensate the sensitivities and performing of adjustment in analog ways to compensate differences among the individual sensors make the adjusting circuits and the adjusting methods complex to increase the apparatus cost.

The object to solve the above-described problems can be attained by performing digital operation (calculation) using the digital correction circuit 220 described above. In the concrete, the sensitivities of the output characteristics f1 and f2 are individually corrected using functions of the first or higher order equation.

$$q1 = a1.f1 + b1 \quad \text{(Equation 1)}$$

$$q2 = a2.f2 + b2 \quad \text{(Equation 2)}$$

Then, the above sensitivity-corrected results are multiplied together.

$$q3 = q1.q2 \quad \text{(Equation 3)}$$

Figure 5:
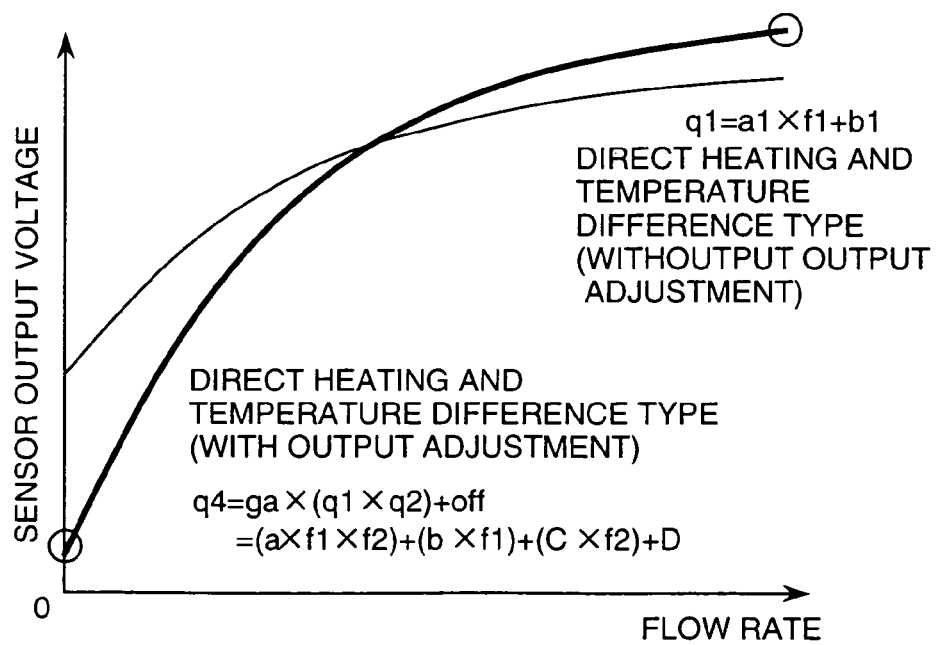
FIG. 5 is a graph showing the characteristics of output voltage versus air flow rate of the thermal air flow meter with output adjustment and without output adjustment.

As the result, it is possible to obtain a better sensitivity characteristic from the low flow rate side to the high flow rate side compared to the essential sensitivities of the output characteristics f1 and f2. As shown in FIG. 5, in order to actually use the calculated result of (Equation 3), further adjustment of the output level is required at interfacing.

$$q4 = ga.q3 + \text{off} = ga.(q1.q2) + \text{off} \quad \text{(Equation 4)}$$

$$= ga.((a1.f1+b1).(a2.f2+b2)) + \text{off}$$

$$= (ga.a1.a2.f1.f2) + (ga.a1.b2.f1) + (ga.a2.b1.f2) + (ga.b1.b2 + \text{off})$$

$$(A.f1.f2) + (B.f1) + (C.f2) + D \quad \text{(Equation 5)}$$

where, A=ga.a1.a2, B=ga.a1.b2, C=ga.a2.b1, and D=ga.b1.b2+off.

As described above, by providing the digital correction means, the essential sensitive correction and output correction of the sensors can be easily performed at a time. The calculation may be performed successively from Equation 1 to Equation 4 described above, or the calculation may be performed in single processing as shown by Equation 5. In the case of Equation 5, if the parameters are calculated in advance and the results are stored, it is advantageous that number of variables can be reduced compared to the case where the correction parameters are individually stored.

According to the present embodiment, there is the effect that in the case of using the sensors different particularly in the output characteristics f1 and f2, the sensitivity can be improved by the digital operating (calculating) means, and number of variables for the sensitivity correction can be reduced to simplify the adjustment.

Figure 6:
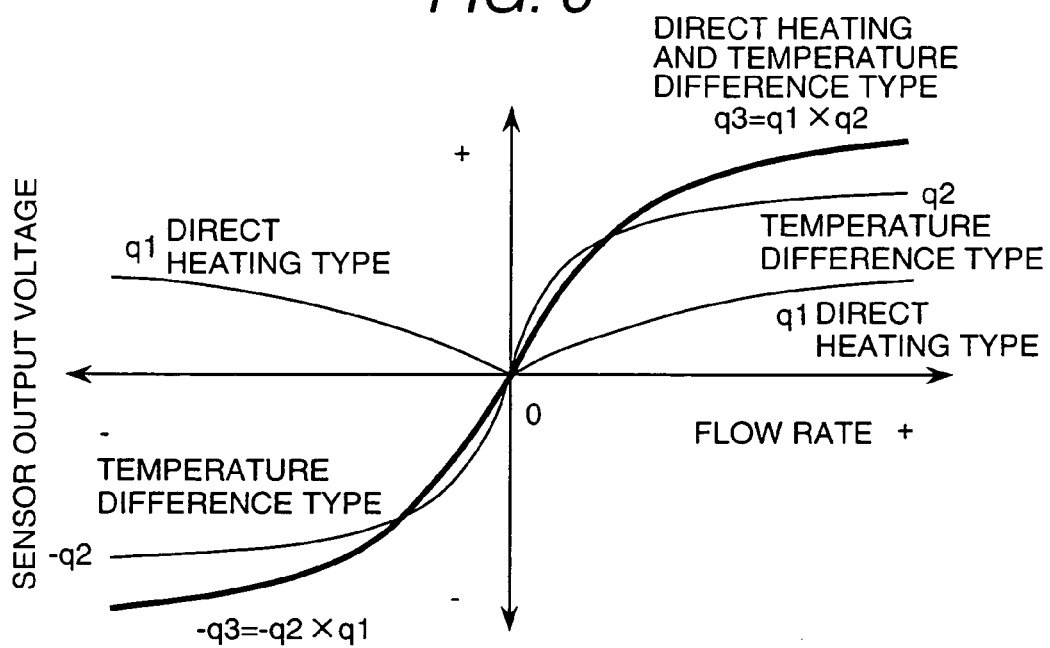
FIG. 6 is a graph showing an example of operating correction of the characteristic of output voltage versus bidirectional air flow rate of the thermal air flow meter.

FIG. 6 is a graph showing an embodiment of correction of the output voltage characteristics of the sensors in accordance with the present invention. The embodiment is in a case where the digital correcting means is used in taking the flowing direction of air flow rate. The characteristic f2 of output versus flow rate obtained from the voltage difference dV between the electric potentials Vb1 and Vb2 of the bridge midpoints, which shows the temperature difference corresponding to the flow rate obtained by the temperature detecting resistors 211d, 211e, 211f and 211g, gives an output value having a sign depending on the flowing direction. FIG. 6 shows the sensitivity-corrected outputs q1 and q2 which are obtained by correcting the output characteristics f1 and f2 using the above-described functions.

The output q2 of the temperature difference type is a positive output value when the flow rate is positive, and is a negative output value when the flow rate is negative. This can be attained in a case where, for example, the analog-digital converter 221a of the digital correction circuit 220 is constructed so as to be receivable of differential-inputting and capable of converting a positive/negative analog differential input to a digital signal having a sign. Particularly, in a case where the sensitivity is different depending on the flow direction, the correction of the output characteristics can be optimized by preparing a plurality of parameters a2u, b2u, a2d and b2d for the parameters a2 and b2 in Equation 2 to change the sensitivity corresponding to the flow direction.

On the other hand, the output q1 of the direct heating type (heat-generating type) is always a positive output value irrespective of the positive or negative flow rate, and accordingly, has no sign. This can be attained in a case where, for example, the analog-digital converter 221b of the digital correction circuit 220 is constructed so as to be receivable of ground-based inputting and capable of converting a positive analog input to a digital signal having no sign. In this case, particularly in Equation 1, the sensitivity is adjusted using the parameters a1 and b1 so that the zero point of q2 and the zero point of q1 may agree with each other.

In the above case of using the output q2 having a sign of the temperature difference type and the output q1 having no sign of the direct heating type, the operation (calculation) of sensitivity correction may be also executed using Equation 3, as in the above embodiment described above, but the multiplied result q3 needs to have a sign.

According to the present embodiment, there is the effect that even in the case where the output characteristics f1 and f2 are different from each other and different in sign such as the outputs with sign and the outputs without sign, sign-added calculation can be easily executed by the correction through the digital processing, and the sensitivity can be corrected irrespective of the flow direction of the flow rate, and accordingly the performance can be improved.

Figure 7:
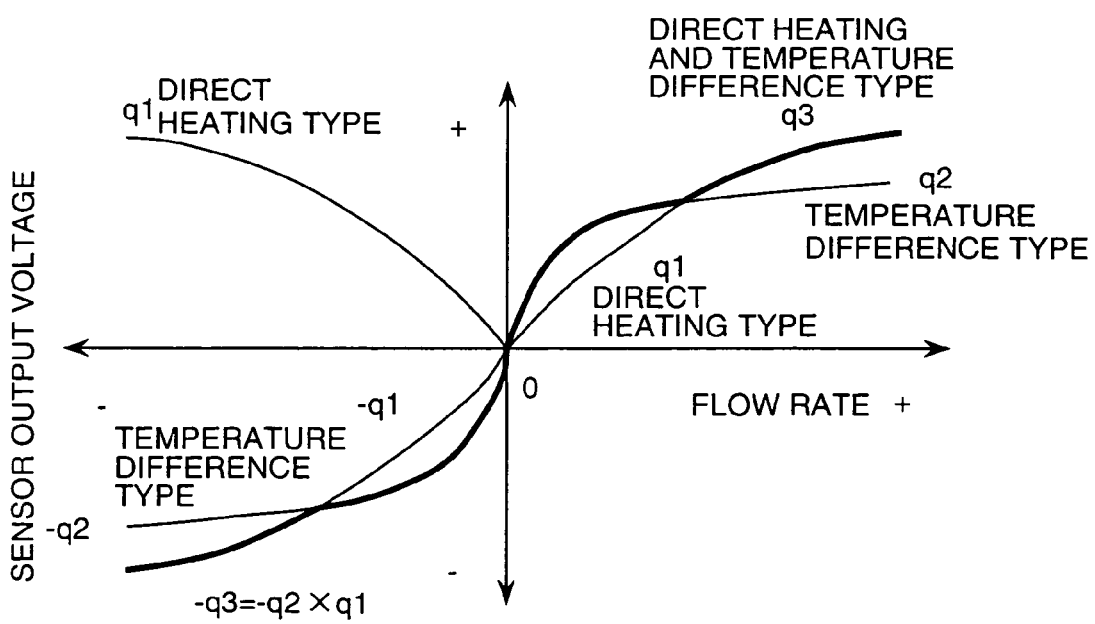
FIG. 7 is a graph showing an example of judging correction of the characteristic of output voltage versus bidirectional air flow rate of the thermal air flow meter.

FIG. 7 is a graph showing the relationship between the sensor output voltage and the flow rate when the digital correcting means is used in taking the flow direction of air flow rate into consideration. The output q2 of the temperature difference type can be obtained as a signal with a sign corresponding to the flow direction, as described above. On the other hand, the output q1 of the direct heating type does not have the sign irrespective of the flow direction. However, in this case, particularly in Equation 1, the sensitivity is adjusted using the parameters a1 and b1 so that the output q1 may exceed the output q2 of the temperature difference type in the high flow rate side, and the zero point of q2 and the zero point of q1 may agree with each other. Further, by checking the sign attached to the output q2 of the temperature difference type, an output −q1, which is obtained by attaching the sign to the output q1 of the direct heating type, is prepared when the flow rate is negative.

In order to make the sensitivity in the low flow rate side and the sensitivity in the high flow rate side compatible with each other, it is judged which is larger, the output q2 of the temperature difference type or the output q1 of the direct heating type. This is realized by a conditional judgment in which, for example, the larger one is selected when the flow rate is positive, and the smaller one is selected when the flow rate is negative. In this case, the judgment is as follows.

$$q1>0, q2.q1 \quad q3=q2 \quad \text{(Equation 6)}$$

$$q1>0, q1>q2 \quad q3=q1 \quad \text{(Equation 7)}$$

$$q1.0, -q2.-q1 \quad -q3=-q2 \quad \text{(Equation 8)}$$

$$q1.0, -q1<-q1 \quad -q3=q1 \quad \text{(Equation 9)}$$

Therein, the minus symbol expresses an output with a sign. By optimizing the parameters, the flow rate output q3 selected corresponding to the flow rates can be expressed by a smooth curve having small steps at switching time. Further, the multiplying processing as shown by Equation 3 previously described can be omitted by the judging operation.

According to the present embodiment, there are effects that even in the case where the output characteristics f1 and f2 are different from each other and different in sign such as the outputs with sign and the outputs without sign, the sensitivity can be corrected by the digital correction and judgment means, and accordingly the performance can be easily improved.

Figure 8:
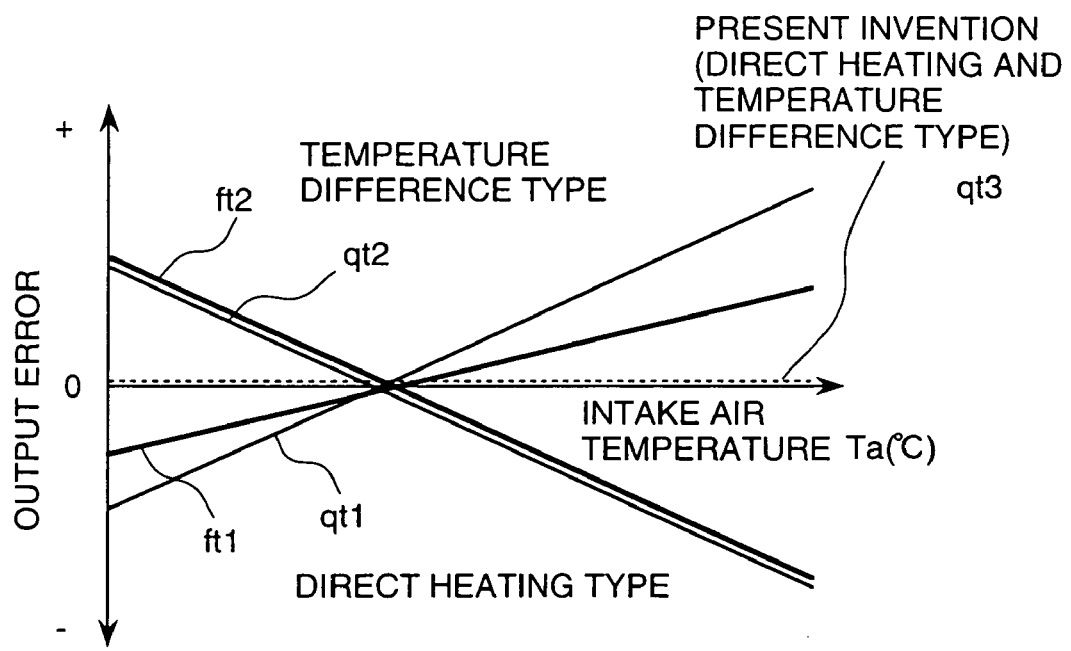
FIG. 8 is a graph showing output errors caused by intake air temperature and an example of the characteristic correction.

FIG. 8 is a graph showing output errors caused by intake air temperature and an example of the characteristic correction. This embodiment intends to improve the temperature characteristic particularly when the output characteristics f1 and f2 are used by combining different characteristics. In considering output errors when temperature of the intake air is changed from normal temperature, an output ft1 of the direct heating type (heat-generating type) is likely to have a positive temperature characteristic to the intake air temperature because the heating temperature is increased corresponding to the temperature of intake air. On the other hand, an output ft2 of the temperature difference type is likely to have a negative temperature characteristic when the temperature detecting resistors are driven by a constant voltage. Among these temperature characteristics, the characteristic of the output ft1 of the direct heating type can be changed by changing the temperature compensation resistor 17 in the bridge. In that case, however, the adjustment becomes complex because the temperature characteristics are not always uniform. In order to solve this problem, the temperature characteristics can be easily improved by executing digital operating correction to change an error ratio to each temperature characteristic.

That is, in Equation 1 and Equation 2 previously described, each of the parameters can be set according to a ratio of change to temperature of intake air. For example, assuming that the output ft1 of the direct heating type is opposite in polarity to and twice as large as the output ft2 of the temperature difference type, characteristics qt1 and qt2 having temperature characteristics opposite to each other are obtained by adjusting the parameters of Equation 1 and Equation 2. By operating these using Equation 3, a characteristic qt3 having a good intake air temperature characteristic can be obtained. The parameters of Equation 1 can be corrected to the intake air temperature Ta, for example, as described below.

$$a1=c1.Ta+d1 \quad \text{(Equation 10)}$$

$$b1=c2.Ta+d2 \quad \text{(Equation 11)}$$

According to the present embodiment, there are effects that even in the case where the output characteristics f1 and f2 are different from each other and the temperature characteristics are different each other, the temperature characteristic performance can be corrected by the digital correction means.

Figure 9:
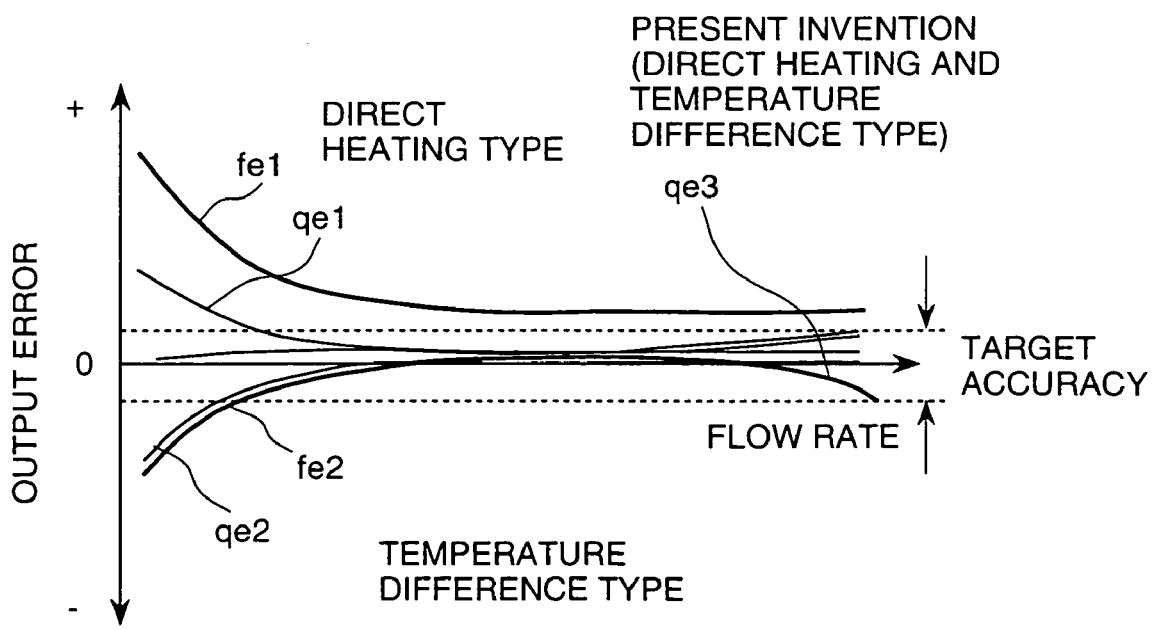
FIG. 9 is a graph showing output errors caused by flow rates and an example of the characteristic correction.

FIG. 9 is a graph showing output errors caused by flow rates and an example of the characteristic correction. This embodiment intends to improve the characteristic of flow rate dependency particularly when the output characteristics f1 and f2 are used by combining different characteristics. The figure shows the states of changes from the basic characteristic of the output corresponding to the flow rate caused by the surrounding temperature, variations in the devices etc. In general, errors in both of the output fe1 of the direct heating type and the output fe2 of the temperature difference type become large in the low flow rate side. The reason is that an allowable amount to variance decreases as the flow rate becomes smaller because of using a relative error for the evaluation, and therefore, the ratio of error increases even when the variance in appearance is the same. Even in such a case, the flow rate dependency can be improved by adjusting the parameters similar to the case of the correction of the intake air temperature described above. For example, characteristics qe1 and qe2, which minimize the flow rate dependency of the output fe1 of the direct heating type to the output fe2, are obtained. By operating these using Equation 3, a characteristic qe3 having a good flow rate dependency can be obtained. The parameters of Equation 1 can be corrected to the output f1 of the direct heating type as described below.

$$a1=g1.f1+h1 \quad \text{(Equation 12)}$$

$$b1=g2.f1+h2 \quad \text{(Equation 13)}$$

By calculating parameters optimum to each of the characteristics in advance and then executing the digital correction using the parameters optimum to each of the sensors, as described above, it is possible to obtain an air flow meter having optimum sensitivity, a good intake air temperature characteristic and a good flow rate dependency.

According to the present embodiment, there are effects that by using the sensors different particularly in the output characteristics f1 and f2 and optimizing the individual use condition of the sensors using the digital correction means, it is possible to obtain an air flow meter having optimum sensitivity, a good intake air temperature characteristic and a good flow rate dependency.

There is a remarkable effect that in the case of using the sensors different particularly in the output characteristics f1 and f2, the sensitivity can be improved by the digital operating means, and number of variables for the sensitivity correction can be reduced to simplify the adjustment. At the same time, there is the effect that the sensitivity correction and the temperature correction according to the flow direction can be easily executed to improve the performance. Further, there is the effect that when the air flow meter is used for controlling an engine of a vehicle, the exhaust gas if the engine can be reduced because the accuracy of measuring the air flow rate is improved.

Embodiment 2

Figure 10:
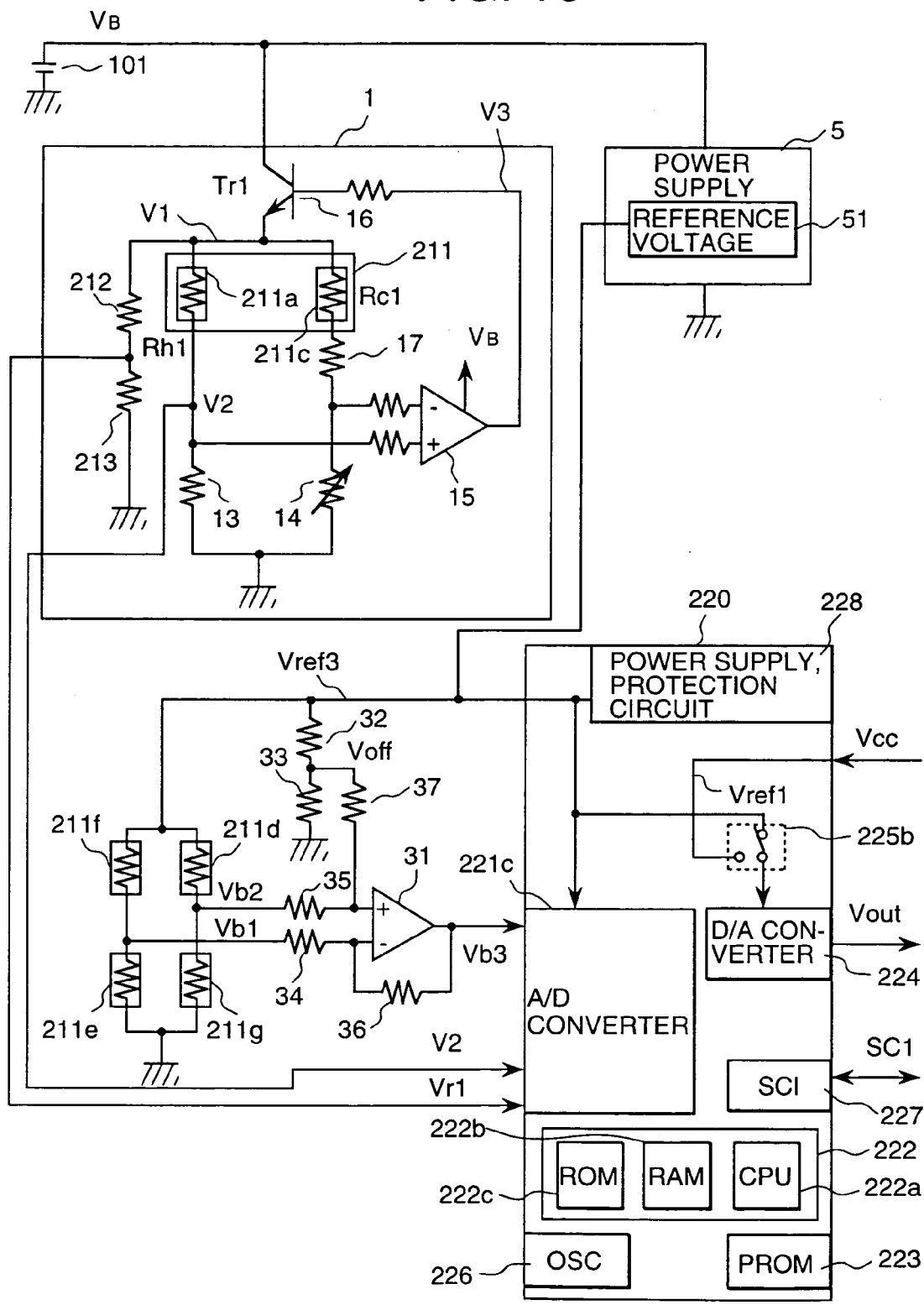
FIG. 10 is a diagram showing a driving circuit of the thermal air flow rate measuring apparatus in accordance with the present invention.

FIG. 10 is a diagram showing a driving circuit of the thermal air flow meter in accordance with the present invention. This embodiment is an example in which the reference voltage circuit in the digital correction circuit 220 is arranged in the outside, compared to the embodiment of FIG. 1. The hot-wire drive circuit 1 is connected to the power supply 101, and outputs a signal corresponding to an air flow rate. The power source circuit 5 is also connected to the power supply 101, and a voltage Vref3 is produced by the reference voltage circuit 51. The voltage Vref3 is supplied as the electric power to the digital correction circuit 220 and to the bridge circuit composed of the temperature detecting resistors 221d, 221e, 221f and 221g.

In the present embodiment, the electric potentials Vb1 and Vb2 of the bridge midpoints of the temperature detecting resistors 221d, 221e, 221f and 221g are inputted to the analog-digital converter 221c of the digital correction circuit 220 as a temperature difference voltage Vb3 which is amplified by resistors 32, 33, 34, 35, 36, 37 and a differential amplifier 31 in taking an offset voltage Voff as the reference.

Further, a voltage signal V2 obtained by converting the current flowing through the above-described heating resistor 211a to a voltage by a resistor 13 and a voltage Vr1 obtained by dividing the applied voltage V1 of the bridge circuit of the hot-wire drive circuit 1 by resistors 212 and 213 are also inputted to the analog-digital converter 221c of the digital correction circuit 220. The analog-digital converter 221c converts a voltage value corresponding to the flow rate to a digital value in taking the voltage Vref3 generated by the reference voltage circuit 51 as the reference, and adjusts the digital value through operation, and then obtains an output voltage Vout from a digital-analog converter 224 to output the obtained signal to an engine control unit and so on.

Therein, the digital-analog converter 224 is constructed so as to be switchable between the voltage Vref3 generated by the reference voltage circuit 51 and the external voltage Vcc using a switch 225b. The reason is that the reference can be freely selected when an analog value is used in the interfacing. In a case where the reference voltage of the analog-digital converter in the side of a connected control unit and the voltage Vcc supplied from the external are similar to each other or fluctuate in synchronism with each other, the voltage Vcc is used as the reference. In a case where there is no relation between the reference voltage of the analog-digital converter in the control unit side and the voltage Vcc, the independent reference voltage Vref3 is selected to make matching with the corresponding control unit easy and to make an error due to mismatching of the analog interface smaller.

Therein, since number of input ports becomes large, it is preferable that instead of using the analog-digital converters 221a and 221b, a single analog-digital converter is used by using a switch. In order to secure the converting speed and to make the circuit size smaller, an analog-digital converter of, for example, a successive comparison type may be used. In this case, the analog-digital converter 221c is constructed so as to be receivable of ground-based inputting, and capable of converting a positive analog input to a digital signal having no sign.

Figure 11:
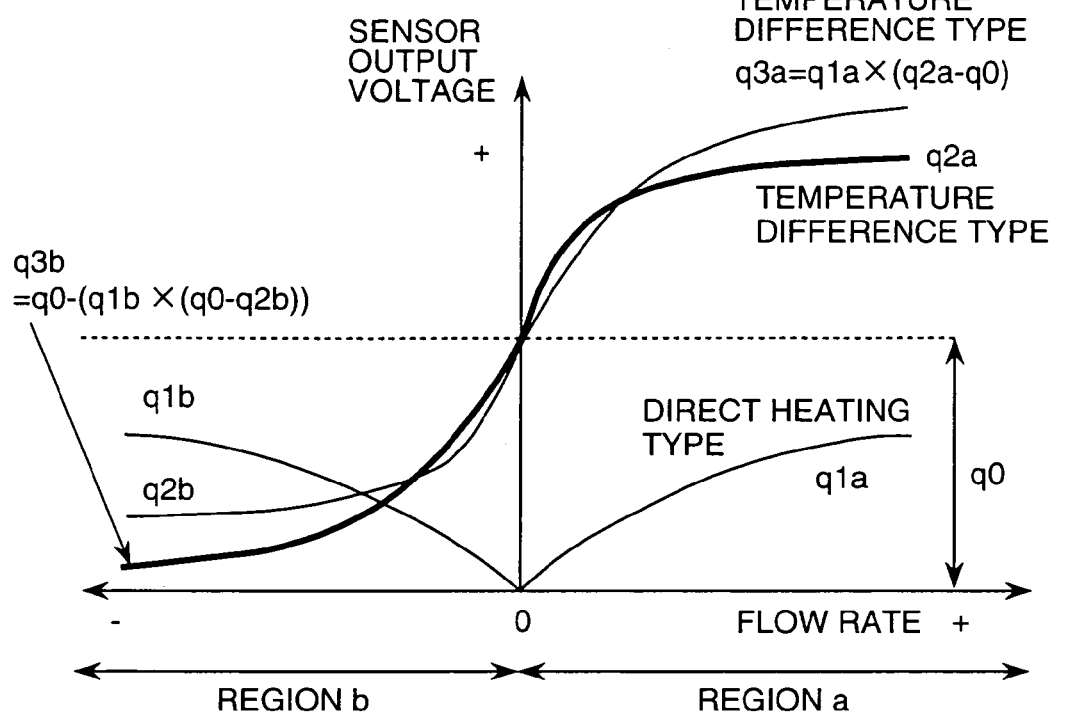
FIG. 11 is a graph showing an example of operating correction of the characteristics of output voltage versus bidirectional air flow rate of the thermal air flow meter.

FIG. 11 is a graph showing an example of operating correction of the characteristics of sensor output voltage versus bidirectional air flow rate. By constructing the digital correction circuit 220 as described above, the output sensitivity can be improved similarly to the previous embodiment, and it is possible to obtain an air flow meter easy to adjust and having a smaller circuit size. The characteristic of output versus flow rate obtained from the voltage signal V2 by converting the current flowing through the heating resistor 211a, described above, is expressed by f1, and the characteristic output versus flow rate obtained from the temperature difference voltage Vb3 obtained by amplifying the electric potentials Vb1 and Vb2 of the midpoints of the bridge composed of the temperature detecting resistors 211d, 211e, 211f and 211g in taking the offset voltage Voff as the reference is expressed by f2.

Therein, instead of using the voltage signal V2, the voltage obtained by dividing the voltage V1 applied to the bridge circuit using resistors 212 and 213 may be used for the output characteristic f1. A different point between the voltages V1 and V2 is difference in the temperature characteristic. Although the temperature characteristic is adjusted by a resistor 17, there is an advantage that the voltage V1 is easy to make the temperature dependency smaller compared to the voltage V2. Further, heated temperature Th of the heating resistor 211a can be calculated by measuring a voltage between the both ends of the heating resistor 211a, and temperature compensation using the heated temperature Th may be employed in order to reduce the temperature dependency. In this case, the calculation of each parameter is as follows.

$$a1 = c1.Th + d1 \quad \text{(Equation 14)}$$

$$b1 = c2.Th + d2 \quad \text{(Equation 15)}$$

The characteristic of output versus flow rate f2 can be obtained by increasing and decreasing the output corresponding to the flow direction. The output of the temperature difference type q2 is a positive output when the flow rate is positive to an offset flow rate q0, and a negative input when the flow rate is negative. Particularly, since the output does not have the sign, it is necessary to perform correction operation taking the offset flow rate q0 into consideration. The output of the direct heating type q1 is always positive when the flow rate is positive and when the flow rate is negative, and accordingly there is no need to take the flow direction into consideration.

In the case of using the output of the temperature difference type q2 without sign and offset described above and the output of the direct heating type q1 without sign, it is necessary to perform correction operation taking the flow direction into consideration.

As an example, sensitivity-corrected q1 and q2 are obtained from the output characteristics f1 and f2 by Equation 1 and Equation 2 previously described. Here, the range where the flow rate is positive is defined as a region a, an output of the temperature difference type in this occasion is defined as q2a, and an output of the direct heating type in this occasion is defined as q1a. Further, the range where the flow rate is negative is defined as a region b, an output of the temperature difference type in this occasion is defined as q2b, and an output of the direct heating type in this occasion is defined as q1b. Calculation of the corrected output obtained by multiplying these outputs is executed by separating condition according to the flow rate.

$$q2 > q0 \quad q3 = q1a.(q2a - q0) \quad \text{(Equation 16)}$$

$$q2.q0 q3 = q0 - (q1b.(q0 - q2b)) \quad \text{(Equation 17)}$$

Figure 12:
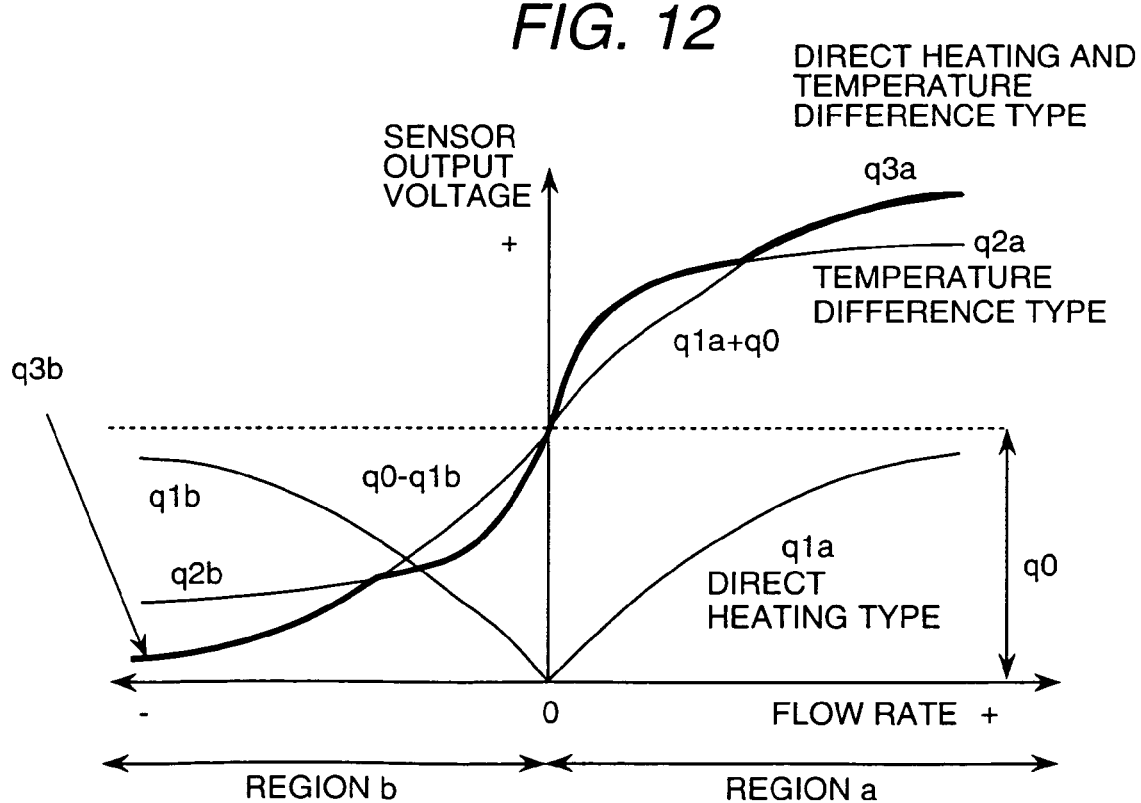
FIG. 12 is a graph showing an example of judging correction of the characteristics of output voltage versus bidirectional air flow rate of the thermal air flow meter.

FIG. 12 is a graph showing an example of judging correction of the characteristics of sensor output voltage versus bidirectional air flow rate. As shown in FIG. 12, in this example, the sensitivity correction is performed by judging magnitude of values using the offset flow rate and the flow direction. Both of the above examples have the same effect as that of the aforementioned embodiment.

According to the present embodiment, there is the effect that even when the output characteristics f1 and f2 are different from each other and without sign, operation (calculation) equivalent to operation for the output characteristics with sign can be performed, and the sensitivity correction can be performed irrespective of the flow direction, and the performance can be improved. Further, there is the effect that the present embodiment can be easily realized even if a general-purpose microcomputer is used because the structure of the digital correction circuit 220 becomes simpler.

Embodiment 3

Figure 13:
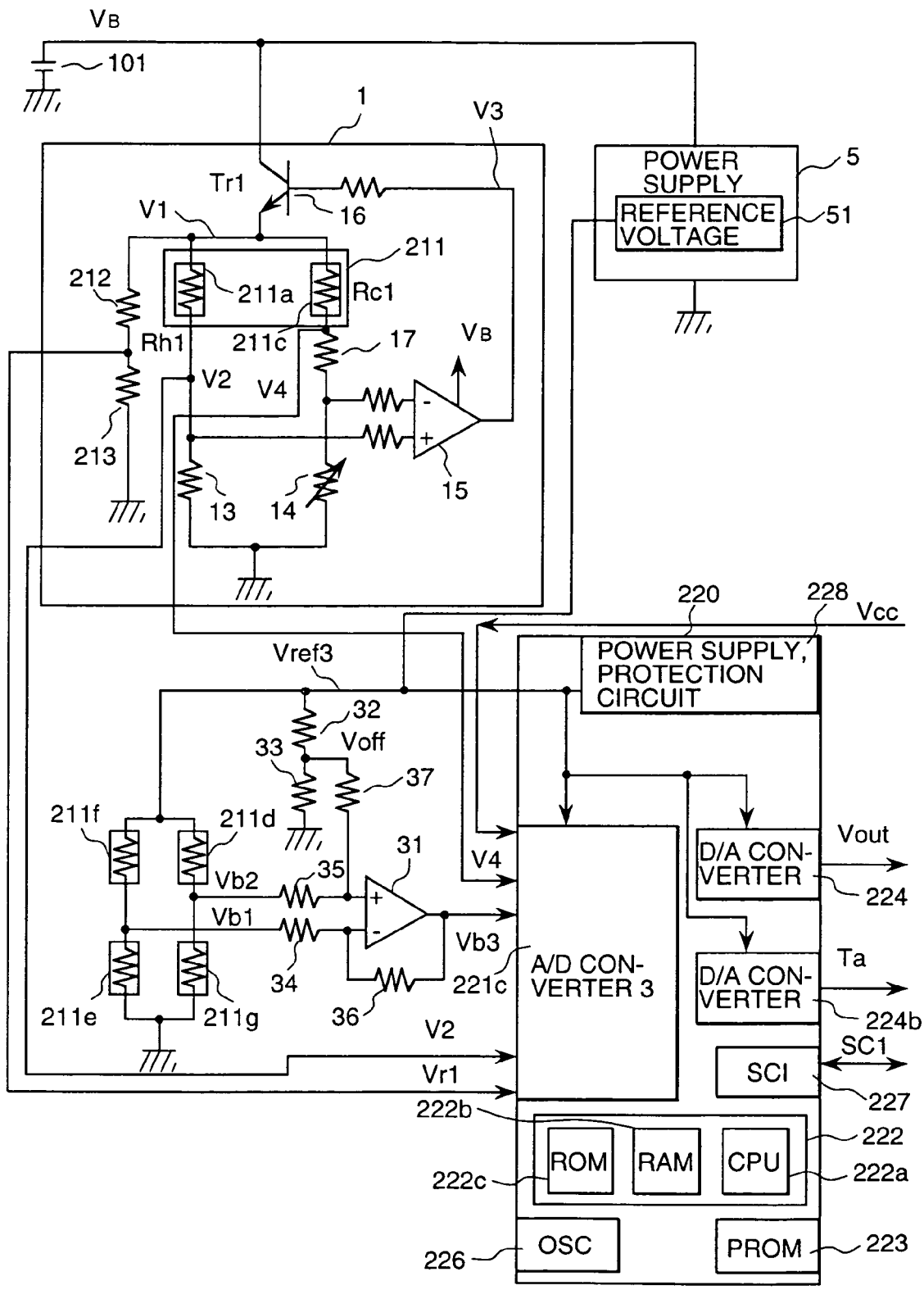
FIG. 13 is a diagram of a driving circuit of the thermal air flow rate measuring apparatus in accordance with the present invention.

FIG. 13 is a diagram of a driving circuit of the thermal air flow meter in accordance with the present invention. Even if the external voltage Vcc is directly inputted to the analog-digital converter 221c and the operation of the dependency of the external voltage is executed in the digital correction circuit 220, as shown in FIG. 13, it is possible to easily obtain the same effect as the effect of the aforementioned embodiments. Further, by imputing the voltage at the both ends of the temperature compensation resistor 211c to the digital correction circuit, the intake air temperature can be calculated, and the voltage can be used for the correction of the intake air temperature and the output of the intake air temperature. In the present embodiment, an analog output of the intake air temperature is realized by providing the digital-analog converter 224b. According to the present embodiment, by using the analog-digital converter having a great number of channels, it is possible to obtain a higher accurate and high-performance air flow meter.

Embodiment 4

Figure 14:
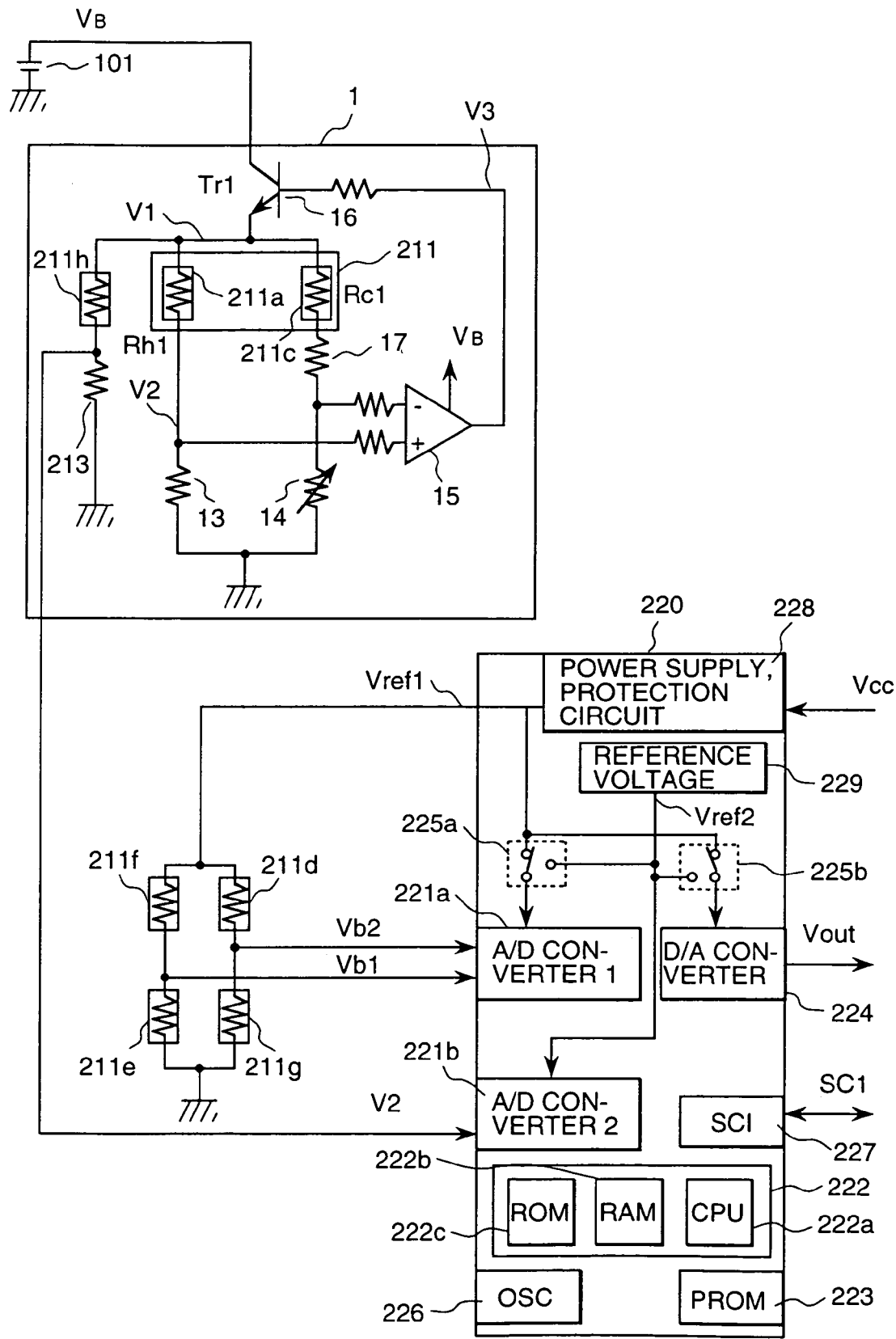
FIG. 14 is a diagram of a driving circuit of the thermal air flow rate measuring apparatus in accordance with the present invention.

FIG. 14 is a diagram of a driving circuit of the thermal air flow meter in accordance with the present invention. When the bridge voltage is detected by dividing the voltage, a resistor 211h having the same temperature coefficient as the temperature compensation resistor 211c, a thermistor or the like is used for one of the bleeder resistors, as shown in FIG. 14. By such a construction, the temperature characteristic of the output V1 may be improved in another manner. Different from the temperature characteristic of the temperature detecting resistors 211d, 211e, 211f and 211g, the temperature dependency of the output V1 can be more finely pre-changed to a desirable characteristic. By changing the configuration of the bleeder resistors, the directional characteristic (positive temperature characteristic or negative temperature characteristic) may be changed. Further, the bleeder resistor 213 is arranged inside the digital correction circuit 220 or in a substrate mounting the digital correction circuit 220 though the temperature compensation resistor 211h is arranged inside the intake air passage, and a resistor having a temperature coefficient suitable for detecting temperature of the substrate is used for the breeder resistor 213. By doing so, the effect of temperature of the substrate can be reduced.

Figure 15:
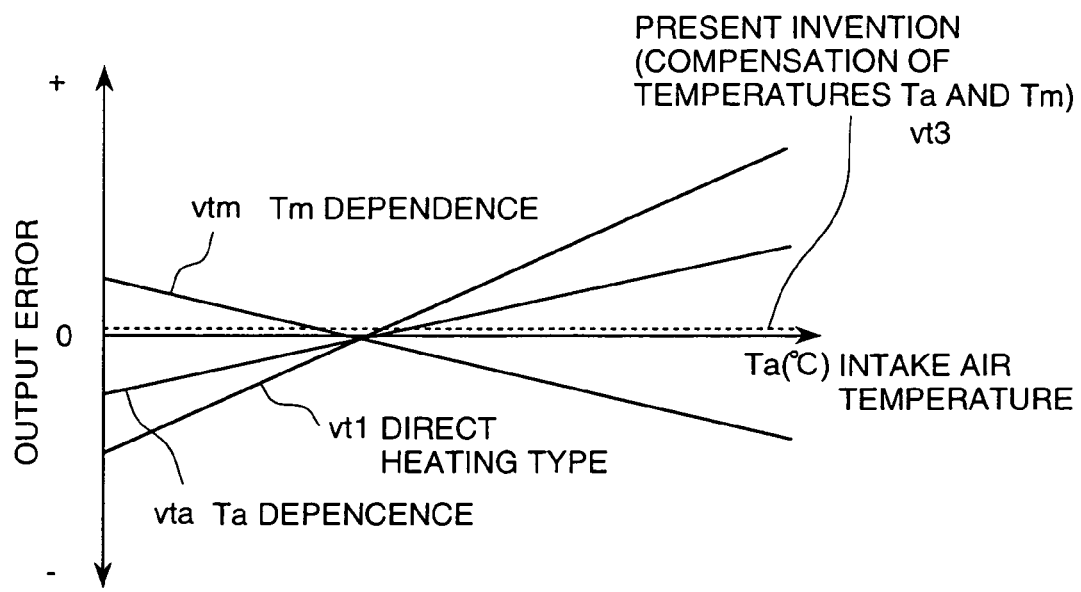
FIG. 15 is a graph showing output errors caused by intake air temperature and by substrate temperature and an example of the characteristic correction.

FIG. 15 is a graph showing temperature dependencies of the individual resistors to intake air temperature. As shown in FIG. 15, the original temperature characteristic vt1 of the direct heating type is improved by the temperature compensation resistor 211h to obtain a characteristic vta. On the other hand, an output vt3 compensated on both of the intake air temperature and the substrate temperature can be obtained from a characteristic vtm compensated on the substrate temperature.

By operating the above results in the digital correction circuit 220, an output having a good temperature characteristic can be obtained. In the present embodiment, by providing the resistor 211h depending on the intake air temperature to pre-compensate the intake air temperature, an air flow meter having a good temperature characteristic can be obtained even if an analog-digital converter having a small number of channels.

Embodiment 5

Figure 16:
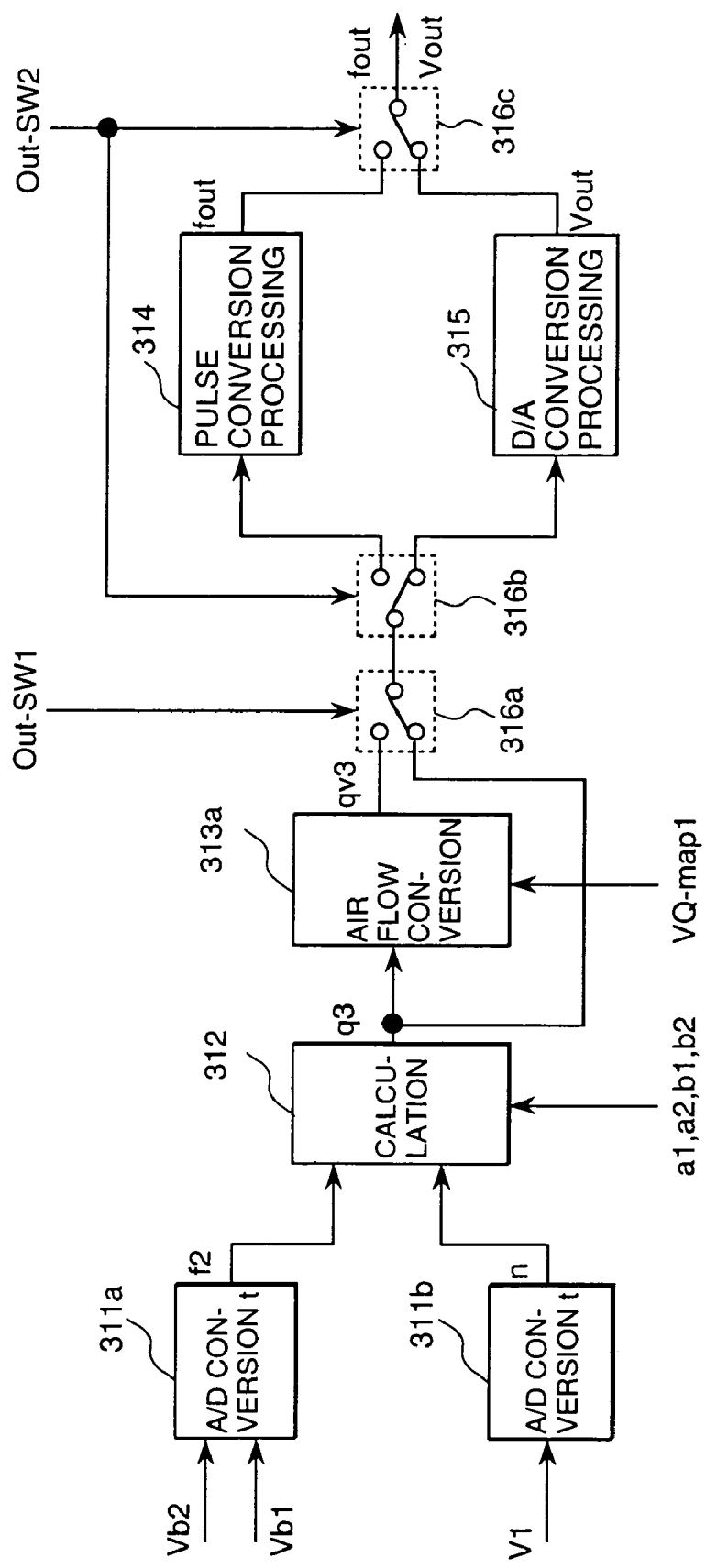
FIG. 16 is a block diagram showing an example of operating correction and output of output-switching.

FIG. 16 is a block diagram showing an example of operating correction and output of output-switching. Description will be made below on software processing of input-and-output in accordance with the present invention. Referring to FIG. 16, characteristics of the signals f1 and f2 obtained from the analog-digital converters 311a and 311b are improved by digital operating correction processing 312 using the parameters a1, a2, b1 and b2, as described in the aforementioned embodiment, and thus a characteristic-improved signal q3 is obtained. The signal q3 is converted to an air flow rate by air flow rate conversion processing 313a, and thus an air flow rate converted signal qv3 is obtained. Therein, the air flow rate is obtained by converting a voltage to a flow rate using, for example, a table called as voltage-flow rate conversion map. The tables called as voltage-flow rate conversion maps may be prepared for individual sensors, or by using a typical characteristic, correction tables may be separately prepared for individual sensors. These tables are recorded in a memory element called as PROM which is writable once or more times, and can hold records without any power source.

Figure 17:
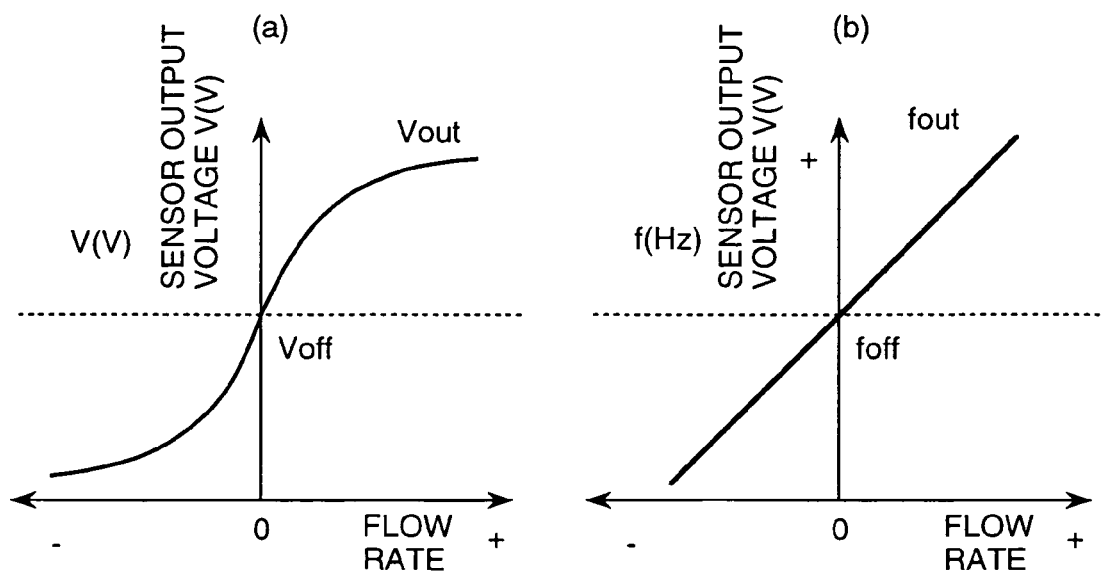
FIG. 17 is graphs showing an example of the characteristics of sensor output versus air flow rate.

In the present embodiment, in regard to the signals, the signal q3 after operation and the signal qv3 converted to air flow rate are switched using a software switch 316a which can be operated by a signal from the external. In regard to output, an output fout converted to frequency by a pulse conversion processing 314 and a voltage value Vout converted by digital-analog conversion processing 315 are switched using software switches 316b and 316c. By switching as described above, outputs shown in FIG. 17 can be arbitrarily obtained. This function can be easily realized by digitization, and a plurality of output interfaces can be realized by the single digital correction circuit 220. Therefore, the present embodiment has the effect that commonality of components and accordingly cost reduction can be achieved.

Embodiment 6

Figure 18:
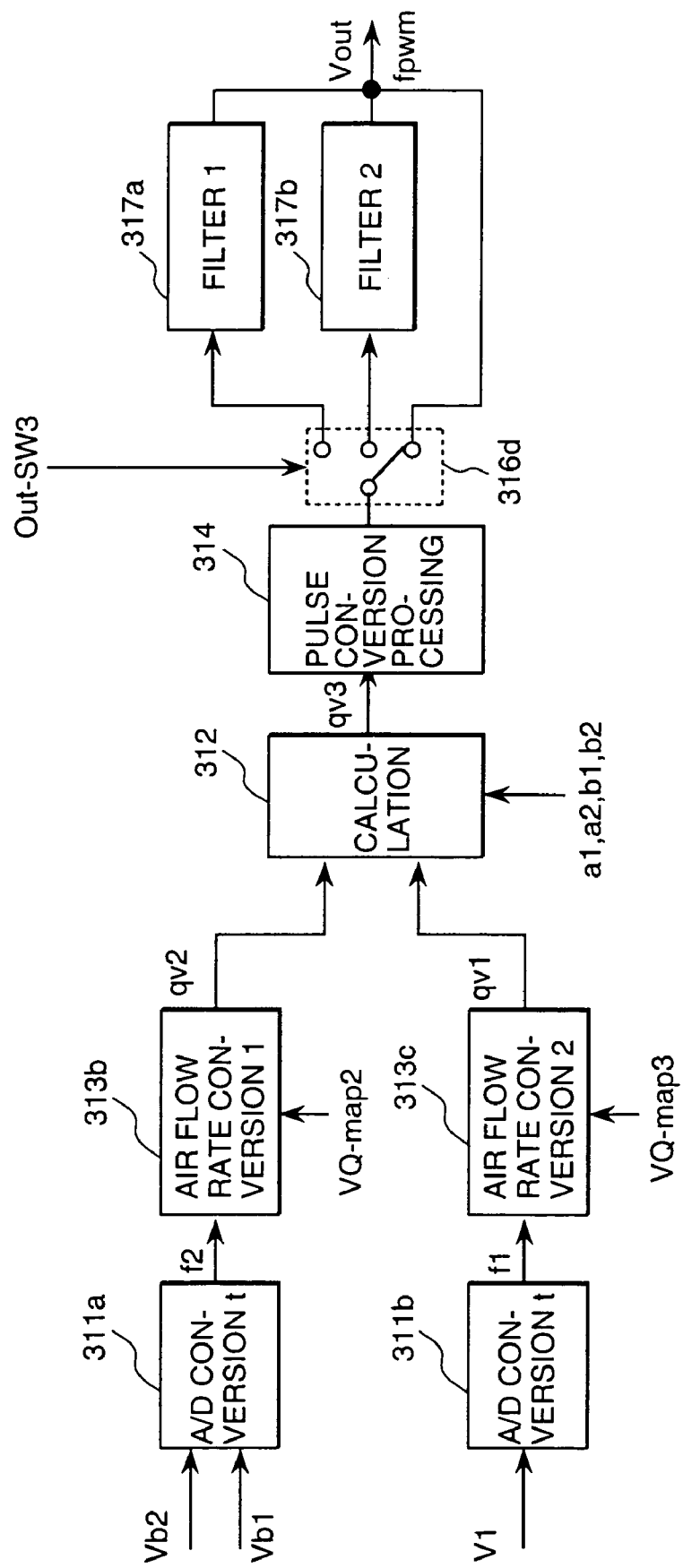
FIG. 18 is a block diagram showing an example of operating correction and output of output-switching.
Figure 19:
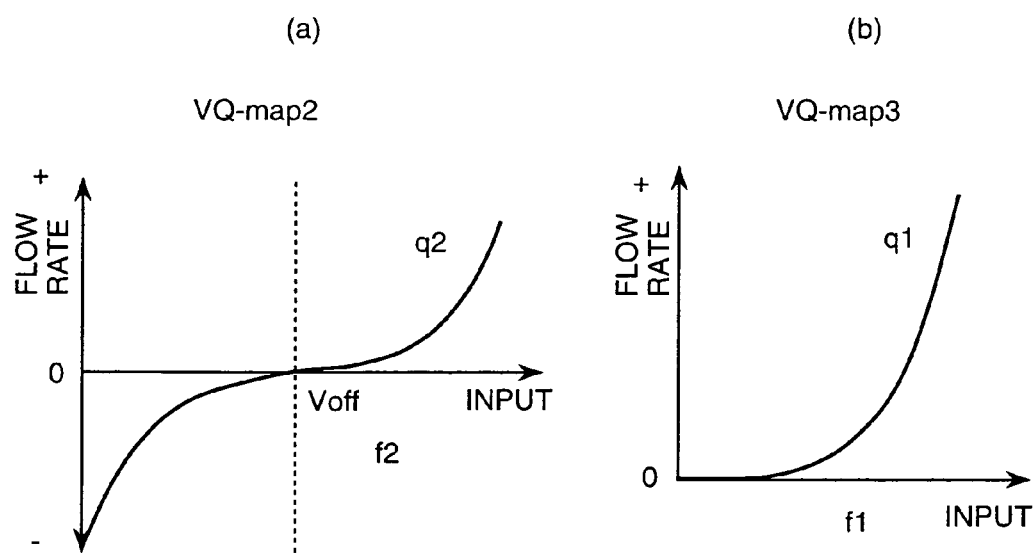
FIG. 19 is graphs showing the conversion characteristics of air flow rate versus analog-digital converted input value.

FIG. 18 is a block diagram showing an example of operating correction and output of output-switching. Referring to FIG. 18, voltages of the signals f1 and f2 obtained from the analog-digital converters 311a and 311b are converted to flow rates using tables called as voltage-flow rate maps shown in FIG. 19. Since the two signals are different in characteristics from each other, the tables are separately prepared. The signals qv2 and qv1 converted respectively through air flow rate conversion processing 313b and 313c are compensated through operation processing 312 to obtain a signal qv3 of which sensitivity of the output is compensated, similarly to in the aforementioned embodiment, and then the digital signal qv3 is converted to a duty of pulse signal through pulse conversion processing 314. The pulse signal is changed to a smoothed analog signal or a pulse output signal by switching a software switch 316d, which is switchable by a signal from the external, to select any one of filters 317a and 317b having characteristics different from each other and to a route without filter. Particularly, by changing the filter characteristic depending on use of the output signal, an accurate analog output can be obtained.

Figure 20:
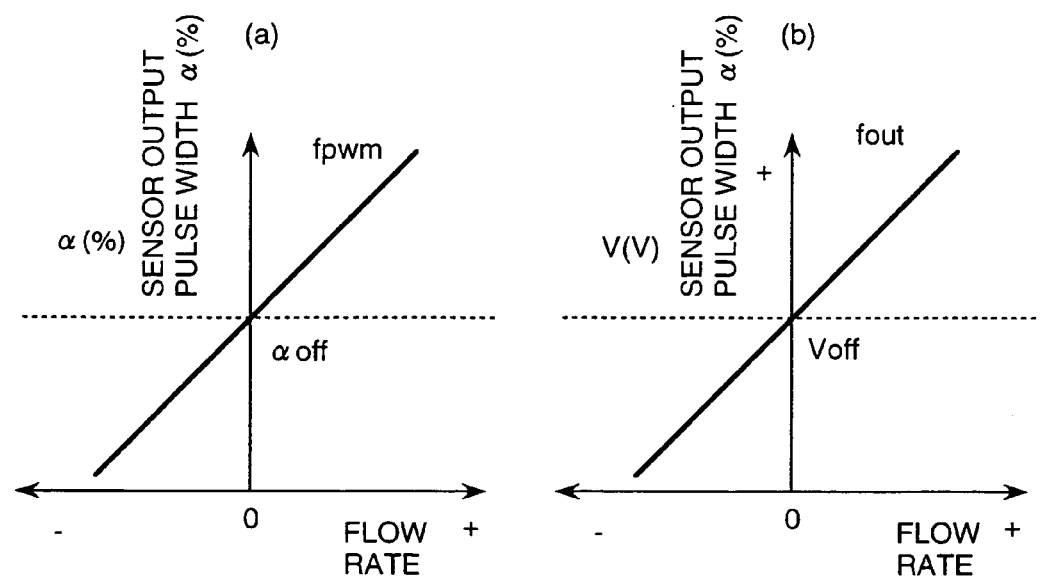
FIG. 20 is graphs showing an example of the characteristics of sensor output versus air flow rate.

Since the relationship between the accuracy and the response generally becomes trade-off when such a pulse signal is filter-converted, the digitalization can easily cope with a case of requiring high accuracy and a case of requiring a high response. FIG. 20 is graphs showing an example of the output characteristics. Referring to the graphs, both of the duty and the output voltage have a similar linear relationship of output signal versus flow rate. From the above results, the present embodiment has the effect that highly accurate outputs can be obtained at low cost.

Embodiment 7

Figure 21:
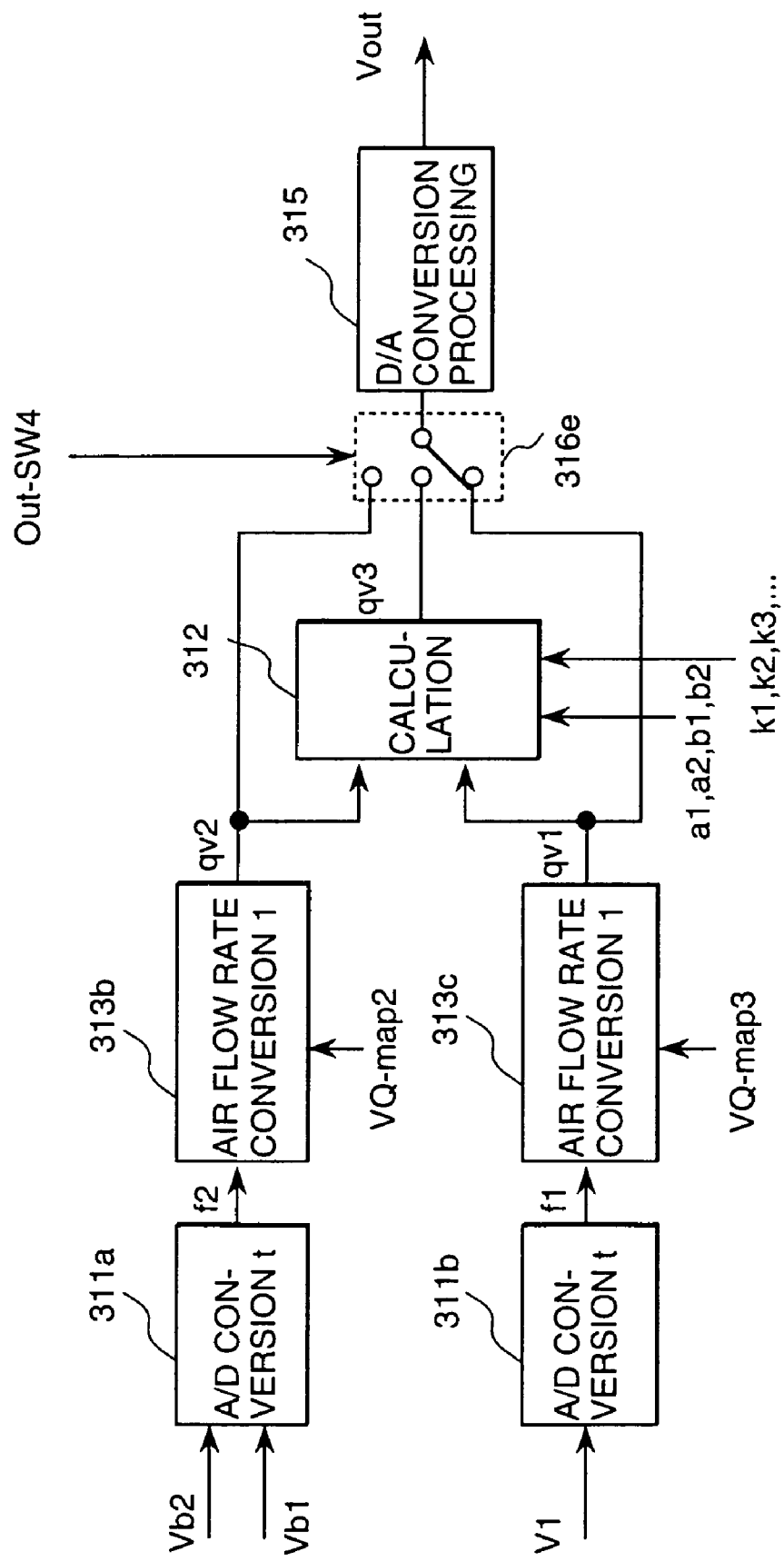
FIG. 21 is a block diagram showing an example of operating correction and switched output after conversion to air flow rate.

FIG. 21 is a block diagram showing an example of operating correction and switched output after conversion to air flow rate. Another kind of input-output software processing will be described below. Referring to FIG. 21, voltages of the signals f1 and f2 obtained from the analog-digital converters 311$a$ and 311$b$ are converted to flow rates using tables called as voltage-flow rate maps shown in FIG. 19. Since the two signals are different in characteristics from each other, the tables are separately prepared. The signals qv2 and qv1 converted respectively through air flow rate conversion processing 313$b$ and 313$c$ are compensated through operation processing 312 to obtain a signal qv3 of which sensitivity of the output is compensated.

Figure 22:
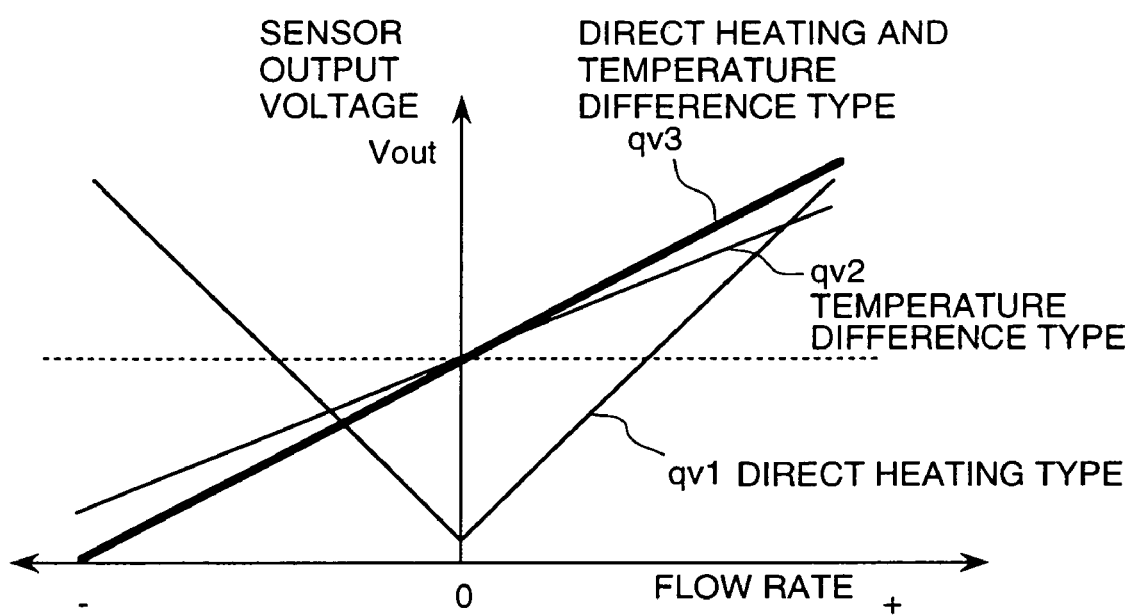
FIG. 22 is a graph showing an example of the characteristics of sensor output versus air flow rate.

Then one of the three different air flow rates qv1, qv2 and qv3 is selected by a software switch 316$e$, which is switchable by a signal from the external, to be processed through digital-analog conversion processing 315. Thus, one of the three flow rates can be obtained as a voltage analog value Vout. FIG. 22 shows the output characteristics. In the operation (calculation) processing 312, interrelation among the two flow rate signals qv2 and qv1 and the output qv3 processed through the operation processing can be adjusted by preparing a plurality of correction parameters k1, k2, k3, k4, . . . This is particularly effective for adjusting of the output, etc. One of the examples will be described below. The signals qv2 and qv1 having different sensitivity characteristics and different temperature characteristics in the initial characteristics are read as analog values using the software switch 316$e$, and then the signal qv3 corrected using the correction parameters a1, a2, b1, b2, k1, k2, k3, k4, . . . is obtained. Particularly when the signals qv2 and qv1 are dispersed, extraction of the parameters becomes easy. Therefore, signals having higher accuracy against sensitivity and temperature can be obtained.

In this processing, since the signals qv2, qv1 and qv3 are separately obtained particularly when the characteristics are changed by fouling, the correction of errors and the re-adjustment can be performed easily, and the long-term characteristics can be compensated. In the present embodiment, highly accurate sensors can be provided at low cost by the higher-level adjustment.

Since an air flow meter having high sensitivity and high accuracy can be obtained by the digital correction described above, there is the effect that engine control for a vehicle can be optimized to reduce exhaust gas from the vehicle.

According to the present invention, it is possible to obtain a thermal air flow rate measuring apparatus and a thermal air flow meter having high accuracy, in which sensitivity is enhanced by an operating means using sensors having different output characteristics and employing a digitized signal, and the sensitivity and temperature can be corrected easily depending on the flow direction of fluid, and to provide an internal combustion engine and a thermal air flow rate measuring method using the thermal air flow rate measuring apparatus. Further, since an air flow meter having high sensitivity and high accuracy can be obtained by the digital correction described above, there is the effect that engine control for a vehicle can be optimized to reduce exhaust gas from the vehicle.

What is claimed is:

1. A thermal air flow rate measuring apparatus comprising at least one heating resistor disposed in a gas fluid; temperature detecting resistors each formed at an upstream part and a downstream part of said heating resistor in a direction of said fluid; means for outputting at least two signals relating to a flow rate of said fluid from said heating resistor and from said temperature detecting resistors; means for quantizing said output values; means for operating said at least two quantized signals using at least two parameters; and a means for synthesizing operated signals and outputting the synthesized result, wherein said two signals relating to said flow rate are signals relating to a heat generating value of said heating resistor and to a temperature difference between said temperature detecting resistors formed at the upstream part and the downstream part and wherein a plurality of said quantized signals is adjusted by a plurality of parameters expressed by a function of at least a first order equation, and said adjusted signals are individually multiplied as output.

2. A thermal air flow rate measuring apparatus comprising at least one heating resistor disposed in a gas fluid; temperature detecting resistors formed at an upstream part and a downstream part of said heating resistor in a flow direction of the fluid; means for outputting at least two signals relating to a flow rate of said fluid from said heating resistor and from said temperature detecting resistors; means for quantizing said output values to produce quantized signals; and means for operating said flow rate and a direction of said fluid based on said quantized signals, wherein said temperature detecting resistors are arranged in multistage along a longitudinal direction of said heating resistor individually at said upstream part and said downstream part and wherein a plurality of said quantized signals is adjusted by a plurality of parameters expressed by a function of at least a first order equation, and said adjusted signals are individually multiplied as output.

3. A thermal air flow rate measuring apparatus comprising at least one heating resistor disposed in a gas fluid; temperature detecting resistors formed at an upstream part and a downstream part of said fluid with respect to said heating resistor; means for outputting at least two signals relating to a flow rate of said fluid from said heating resistor and from said temperature detecting resistors; means for quantizing said output values as quantized signals; means for operating said flow rate based on said quantized signals using at least two parameters, wherein at least one of said quantized signals is adjusted by a plurality of parameters expressed by a function of the first or higher order equation, and said plurality of adjusted signals are individually multiplied to be output.

4. A thermal air flow rate measuring apparatus according to claim 3, wherein at least one of the signals quantized by said quantizing means is a sign relating to a flowing direction of said fluid, and said function is selected depending on said sign, and signals adjusted by adding said signs to said quantized signals make a plurality of flowing directions of said fluid detectable.

5. A thermal air flow rate measuring apparatus according to claim 4, wherein at least one of the quantized signals by said quantizing means has a reference point in regard to a flowing direction of said fluid, and said function is selected depending on magnitude of the signals with respect to said reference point, and said signals adjusted by adding said signs to said quantized signals are used.

6. A thermal air flow rate measuring apparatus according to claim 3, wherein at least two of the quantized signals by said quantizing means are adjustable by said plurality of parameters and external signals.

7. A thermal air flow rate measuring apparatus comprising at least one heating resistor disposed in a gas fluid; temperature detecting resistors formed at an upstream part and a downstream part of said fluid with respect to said heating resistor; means for outputting at least two signals relating to a flow rate of said fluid from said heating resistor and from said temperature detecting resistors; means for quantizing said output values as quantized signals; and means for operating said flow rate based on said quantized signals using at least two parameters, wherein at least one of the quantized signals by said quantizing means is adjusted by said plurality of parameters each expressed by a function of the first or higher order equation, and magnitude of said plurality of adjusted signals is judged to output said signal having the larger magnitude.

8. A thermal air flow rate measuring apparatus comprising at least one heating resistor disposed in a gas fluid; temperature detecting resistors formed at an upstream part and a downstream part of said fluid with respect to said heating resistor; means for outputting at least two signals relating to a flow rate of said fluid from said heating resistor and from said temperature detecting resistors; means for quantizing said output values as quantized signals; and means for operating said flow rate based on said quantized signals using at least two parameters, wherein at least one of said parameters is a function relating to temperature, at least one of the at least two parameters is processed arithmetically by applying a function of at least a first order equation and wherein the air flow signal is obtained arithmetically as the function relating to the temperature.

9. A thermal air flow rate measuring apparatus comprising at least one heating resistor disposed in a gas fluid; temperature detecting resistors formed at an upstream part and a downstream part of said fluid with respect to said heating resistor; means for outputting at least two signals relating to a flow rate of said fluid from said heating resistor and from said temperature detecting resistors; means for quantizing said output values as quantized signals; and operating means for operating said flow rate based on said quantized signals using at least two parameters, wherein said quantizing means is composed of a plurality of quantizing devices which are set independently of a reference voltage to be used as a reference of quantization.

10. A thermal air flow rate measuring apparatus according to claim 9, wherein at least one of said plurality of quantizing devices is means for executing quantization with sign having a differential input port.

11. A thermal air flow rate measuring apparatus according to claim 9, wherein said quantized signals are pre-converted to air flow rates and then operated using said at least two parameters, and an operated value operated using said at least two parameters and individual air flow rates values of converted air flow rates are selectably output by an external signal.

12. A thermal air flow rate measuring apparatus according to claim 11, wherein said selected output is obtained by pulse-converting said quantized digital value and then analog-converting said pulse-converted value, and filters are selectably used when said pulse-converted value is analog-converted.

13. A thermal air flow rate measuring apparatus comprising at least one heating resistor disposed in a gas fluid; temperature detecting resistors formed at an upstream part and a downstream part of said fluid with respect to said heating resistor; means for outputting at least two signals relating to a flow rate of said fluid from said heating resistor and from said temperature detecting resistors; means for quantizing said output values as quantized signals; and operating means for operating said flow rate based on said quantized signals using at least two parameters, wherein at least one of said signals is pre-added with a temperature characteristic by a temperature compensation resistor.

14. A thermal air flow rate measuring apparatus comprising at least one heating resistor disposed in a gas fluid; temperature detecting resistors formed at an upstream part and a downstream part of said fluid with respect to said heating resistor; means for outputting at least two signals relating to a flow rate of said fluid from said heating resistor and from said temperature detecting resistors; means for quantizing said output values as quantized signals; and operating means for operating said flow rate based on said quantized signals using at least two parameters, wherein said quantized signals are operated using said parameters and then converted to air flow rates, and said converted air flow rate values are selectably output by an external signal, and selected output is any one of an analog value obtained by analog-converting a quantized digital value corresponding to an air flow rate, a frequency obtained by pulse-converting said digital value, or a duty obtained by PWM pulse-converting said digital value.

* * * * *